(12) United States Patent
Kobayashi et al.

(10) Patent No.: US 8,475,315 B2
(45) Date of Patent: Jul. 2, 2013

(54) SWING INTERNAL CONTACT TYPE PLANETARY GEAR DEVICE AND ROTATION DRIVE DEVICE

(75) Inventors: Tsune Kobayashi, Okazaki (JP); Motoyasu Yamamori, Nagoya (JP); Atsushi Ando, Kariya (JP); Katsuhito Yoshinaga, Kashihara (JP); Hideki Shibata, Kariya (JP); Akira Saito, Obu (JP); Tohru Onozaki, Nagoya (JP); Naomasa Mukaide, Kariya (JP); Tomohiko Haruyama, Kariya (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/577,808

(22) PCT Filed: Feb. 15, 2011

(86) PCT No.: PCT/JP2011/053185
§ 371 (c)(1),
(2), (4) Date: Sep. 7, 2012

(87) PCT Pub. No.: WO2011/099636
PCT Pub. Date: Aug. 18, 2011

(65) Prior Publication Data
US 2013/0045827 A1    Feb. 21, 2013

(30) Foreign Application Priority Data

Feb. 15, 2010 (JP) ................................ 2010-030585
Nov. 5, 2010 (JP) ................................ 2010-248449
Nov. 5, 2010 (JP) ................................ 2010-248450

(51) Int. Cl.
*F16H 1/32* (2006.01)

(52) U.S. Cl.
USPC ............... 475/180; 74/411; 74/462; 475/162

(58) Field of Classification Search
USPC ................... 475/162, 163, 173, 180; 74/411, 74/462
See application file for complete search history.

(56) References Cited

U.S. PATENT DOCUMENTS 2,863,336 A * 12/1958 Parstorfer ..................... 475/180
3,077,125 A * 2/1963 Louton, Jr. et al. ........... 475/162

(Continued)

FOREIGN PATENT DOCUMENTS

JP    A-61-153040    7/1986
JP    A-01-210642    8/1989

(Continued)

OTHER PUBLICATIONS

May 17, 2011 International Search Report issued in Patent Application No. PCT/JP2011/053185.

*Primary Examiner* — Justin Holmes
(74) *Attorney, Agent, or Firm* — Oliff & Berridge, PLC

(57) ABSTRACT

An easily structured swing internal contact type planetary gear device is proposed which can achieve a higher meshing ratio when an involute tooth profile is adapted. Each of an internal tooth of an internally toothed gear wheel and an external tooth of an externally toothed gear wheel is formed with an involute tooth profile. Under a driving condition, one of an internal tooth body of the internally toothed gear wheel and an external tooth body of the externally toothed gear wheel is elastically deformed in an extending direction and the other thereof is elastically deformed in a contracting direction so that the number of meshing teeth becomes larger than the number of meshing teeth under a non-driving condition.

5 Claims, 14 Drawing Sheets

U.S. PATENT DOCUMENTS

| | | | | |
|---|---|---|---|---|
| 4,099,427 | A * | 7/1978 | Fickelscher | 475/176 |
| 4,259,875 | A * | 4/1981 | Rouverol | 74/462 |
| 4,589,300 | A * | 5/1986 | Rouverol | 74/462 |
| 4,760,759 | A * | 8/1988 | Blake | 475/159 |
| 5,505,668 | A * | 4/1996 | Koriakov-Savoysky et al. | 475/180 |
| 5,536,218 | A | 7/1996 | Fukaya et al. | |
| 6,418,810 | B1 * | 7/2002 | Kerr | 74/462 |
| 6,799,489 | B2 * | 10/2004 | Ishikawa | 74/640 |
| 8,061,229 | B2 * | 11/2011 | Zhuravlev | 74/457 |
| 8,152,676 | B2 * | 4/2012 | Kobayashi et al. | 475/162 |
| 2004/0097319 | A1 | 5/2004 | Tsurumi | |
| 2009/0044651 | A1 * | 2/2009 | Yamamori et al. | 74/461 |
| 2011/0245030 | A1 * | 10/2011 | Wakida et al. | 475/331 |

FOREIGN PATENT DOCUMENTS

| | | |
|---|---|---|
| JP | B2-5-34537 | 5/1993 |
| JP | A-07-133847 | 5/1995 |
| JP | A-10-227340 | 8/1998 |
| JP | A-2002-266955 | 9/2002 |
| JP | A-2003-262257 | 9/2003 |
| JP | A-2005-278234 | 10/2005 |
| JP | A-2007-024072 | 2/2007 |
| JP | A-2007-263255 | 10/2007 |
| JP | A-2008-208911 | 9/2008 |
| JP | A-2009-008143 | 1/2009 |
| JP | A-2009-174593 | 8/2009 |

* cited by examiner

Number of external teeth Na/Number of internal teeth Nb

Number of internal teeth

SWING INTERNAL CONTACT TYPE PLANETARY GEAR DEVICE AND ROTATION DRIVE DEVICE

TECHNICAL FIELD

This invention relates to a swing internal contact type planetary gear device and a rotation drive device using the planetary gear device.

BACKGROUND OF THE TECHNOLOGY

Conventionally, an example of the swing internal contact type planetary gear device is disclosed in a Japanese Patent Application published as JP2002-266955 A. This swing internal contact type planetary gear device is of a cycloid reduction gear device type having an eccentric body rotating about an input/output axial line and having an eccentric axial line deviated from the input/output axial line as a center, an internally toothed gear wheel formed with a plurality of internal teeth provided about the center of the input/output axial line and an externally toothed gear wheel supported on the eccentric body for relative rotation therewith and formed with a plurality of external teeth provided about the center of the eccentric axial line, the externally toothed gear wheel being swingably relatively rotating with the internally toothed gear wheel in engagement therewith. In such cycloid reduction gear mechanism, each internal tooth of the internally toothed gear wheel serves as a pin and each external tooth of the externally toothed gear wheel is formed to have a trochoid tooth profile.

By thus configuring the reduction gear device, the number of tooth differences between the internally toothed gear wheel and the externally toothed gear wheel can be minimized and accordingly, a high reduction gear ratio can be obtained. Further, according to this structure, since a high meshing ratio between the internally toothed gear wheel and the externally toothed gear wheel can be obtained, these gear wheels are known to have a gear with high rigidity and tensile. In this structure, further higher reduction ratio may be achieved due to the increase of the number of teeth in each internally toothed gear wheel and externally toothed gear wheel. However, by the pin and trochoid tooth profile meshing engagement structure, the device may have a problem in oversized diameter, if the number of tooth is increased.

While on the other hand, an involute tooth profile is known as a gear wheel, in which a plenty of teeth can be formed on the gear. The gear wheels with involute tooth profile adapted to the swing internal contact type planetary gear device are already disclosed in JP2009-8143 A, JP5 (1993)-34537 B, JP2007-24072 A, JP1 (1989)-210642 A and JP10 (1998)-227340 A, and have become a public knowledge.

DISCLOSURE OF THE INVENTION

Problems to be Solved by the Invention

However, it would not be easy to configure the device with minimized tooth difference in number between the internally toothed gear wheel and the externally toothed gear wheel due to an interference caused at the tooth tip portions when an involute tooth profile is adapted to the internally toothed gear wheel and the externally toothed gear wheel. Further, the gear meshing ratio becomes low and the load to be received by the meshing tooth becomes large when the involute tooth profile is used. Accordingly, in order to transmit a large torque, the increase of the rigidity for the toothed gear wheel was necessary.

According to the disclosure of JP1 (1989)-210642, the structure has adapted a combination of the internally toothed gear wheel and the externally toothed gear wheel with a slightly different number of teeth, and therefore, the distance between each tooth flank is very short and the substantial meshing ratio becomes very high with a very small deformation of the tooth due to the load torque applied thereon. Thus the document says that this structure makes it possible to achieve a high-torque transmission.

However, the inventors of this application found out a problem that the tip end angled portion of the internal or external tooth may be brought into contact with the tooth flank of the corresponding mating tooth when the internal tooth of the internally toothed gear wheel and the external tooth of the externally toothed gear wheel are deformed. When the tip end angled portion of the internal or external tooth is brought into contact with the tooth flank of the corresponding mating tooth, a high surface pressure is generated at the tooth flank of the mating tooth. In other words, in order to have the surface pressure applied on the mating tooth flank to be within a durable pressure range, the torque to be transmitted eventually had to be decreased due to the receiving surface pressure.

The present invention was made in consideration with the above problems and the object of the invention is to provide a swing internal contact type planetary gear device which can achieve a high torque transmission as well as the achievement of obtaining a high meshing ratio when the involute tooth profile is adopted. Further, the object of the invention is to provide a rotation driving device using the swing internal contact type planetary gear device.

It is noted here that as a drive device for an electrically assisted bicycle, the publication JP2005-278234 A discloses one example of such drive devices. The drive device is provided at the hub portion of the front wheel of the bicycle and formed by a motor and a speed reduction gear device. A planetary gear reduction gear device is applied to this speed reduction gear device. Particularly, a drive device for an electrically operated bicycle is required to be downsized and light-weighted because of the arrangement thereof to the hub portion of the front wheel. For these reasons, a down-sized, but yet having a high reduction gear ratio drive device is desirable, particularly when used for an electrically operated bicycle.

Accordingly, the object of the invention is to provide a swing internal contact type planetary gear device suitable for use for an electrically assisted bicycle or the like.

Means for Solving the Problems (Swing Internal Contact Type Planetary Gear Device)

According to the swing internal contact type planetary gear device of the present invention, the device comprises an eccentric body rotating about an input/output axial line and having a center line being an eccentric axial line, the eccentric axial line is deviated from the input/output axial line; an internally toothed gear wheel provided with an annular internal tooth body and a plurality of internal teeth formed integrally with the internal tooth body in an inner circumferential side thereof, the center line thereof being the input/output axial line; and an externally toothed gear wheel provided with an annular external tooth body and a plurality of external teeth formed integrally with the external tooth body in an outer circumferential side thereof, the externally toothed gear wheel being relatively rotatably supported on the eccentric body and swingably rotating relative to the internally toothed gear wheel in meshing engagement therewith under the driving condition, the center line thereof being the eccentric axial line, characterized in that each of the internal and external teeth is provided with an involute tooth profile and under the driving condition, one of the internal tooth body and the external tooth body elastically deforms in an extending direction in a circumferential direction and the other of the internal tooth body and the external tooth body elastically deforms in a contracting direction in a circumferential direction, whereby the number of meshing teeth between the internal tooth and the external tooth is set to be larger than the number of meshing teeth between the internal tooth and the external tooth under a non-driving condition.

In other words, the number of meshing teeth between the internal tooth and the external tooth is designed to be increased not by the deflective deformation of the internal and the external teeth, but by an elastic deformation of the external and the internal tooth bodies, one of the external and the internal tooth bodies being deformed in an extending direction in a circumferential direction and the other of the external and the internal tooth bodies being deformed in a contracting direction in a circumferential direction.

Further, it may be that assuming that a tooth number "i" of each of reference meshing teeth of the internal tooth and the external tooth meshing with each other under a non-driving condition is defined as "1" and the number "i" of each of the internal tooth and the external tooth is defined to be the value added every one (1) whenever it is leaving away from the reference meshing tooth, a displacement amount in an extending direction of one of the teeth between the internal tooth and the external tooth, each tooth being numbered as "i", is defined to be the value of $\delta_{1,i}$, a displacement amount in a contracting direction of the other of the teeth between the internal tooth and the external tooth, each tooth being numbered as "i", is defined to be the value of $\delta_{2,i}$, and that, a gap between the tooth flank of the internal tooth and the tooth tip of the external tooth each tooth being numbered as "i", is defined to be the value of $\delta_i$, wherein, a module of each of the internally toothed gear wheel and the externally toothed gear wheel is set as the value satisfied the following formula (1):

[M1(mathematical formula 1)]

$$|\delta_{1,i} + \delta_{2,i}| = \delta_i \quad (1)$$

Further, it may be that the displacement amount $\delta_{1,i}$ in the extending direction of the one of the teeth between the internal tooth and the external tooth, each tooth being numbered as "i", is defined to be the value obtained by the following formula (2), the displacement amount $\delta_{2,i}$ in the contracting direction of the other of the teeth between the internal tooth and the external tooth, each tooth being numbered as "i", is defined to be the value obtained by the following formula (3) and the gap $\delta_i$ between the tooth flank of the internal tooth and the tooth tip of the external tooth each tooth being numbered as "i" is defined to be the value obtained by the following formula (4):

[M2]

$$\delta_{1,i} = \frac{P_{1,i}}{E \cdot S_{1,i}}\left[T - \sum_{n=1}^{i}(F_{1,i} \cdot \cos\alpha_{x1})\right] + \Delta t_{1,i} \quad (2)$$

$\delta_{1,i}$: Displacement amount of the i-th tooth from the reference meshing tooth in an extending direction.
$P_{1,i}$: Pitch width of the i-th tooth from the reference meshing tooth.
$S_{1,i}$: Effective cross sectional area of the i-th tooth from the reference meshing tooth.
$F_{1,i}$: Force received by the i-th tooth of the one of the external tooth and the internal tooth from the reference meshing tooth and applied by the other of the external tooth and the internal tooth.
E: Longitudinal elastic modulus of the one of the externally toothed gear wheel and the internally toothed gear wheel.
T: Force transmitted between the externally toothed gear wheel and the internally toothed gear wheel.
$\Delta t_{1,i}$: Deflection amount of the i-th tooth of the one of the internal tooth and the external tooth from the reference meshing tooth in a circumferential direction.
$\alpha_{x1}$: Random circular pressure angle from the base circle to the tooth tip.
wherein, the suffix "1" means one of the externally toothed gear wheel and the internally toothed gear wheel.

[M3]

$$\delta_{2,i} = \frac{P_{2,i}}{E \cdot S_{2,i}}\left[T - \sum_{n=1}^{i}(F_{2,i} \cdot \cos\alpha_{2,i})\right] - \Delta t_{2,i} \quad (3)$$

$\delta_{2,i}$: Displacement amount of the i-th tooth from the reference meshing tooth in a contracting direction.
$P_{2,i}$: Pitch width of the i-th tooth from the reference meshing tooth.
$S_{2,i}$: Effective cross sectional area of the i-th tooth from the reference meshing tooth.
$F_{2,i}$: Force applied by the external tooth and received by the i-th tooth from the reference meshing tooth.
E: Longitudinal elastic modulus of the other of the externally toothed gear wheel and the internally toothed gear wheel.
T: Force transmitted between the externally toothed gear wheel and the internally toothed gear wheel.
$\Delta t_{2,i}$: Deflection amount of the i-th tooth of the other of the internal tooth and the external tooth from the reference meshing tooth in a circumferential direction.
$\alpha_{x1}$ and $\alpha_{x2}$: Random circle pressure angle from the base circle to the tooth tip. Wherein, the suffix "2" means the other of the externally toothed gear wheel and the internally toothed gear wheel.

[M4]

$$\begin{aligned}\delta_i &= \sqrt{(X_{2,i} - X_{1,i})^2 + (Y_{2,i} - Y_{1,i})^2} \\ &= f(m, \alpha, z_1, z_2, x_1, x_2, a)\end{aligned} \quad (4)$$

$\delta_i$: Gap between the i-th external tooth tip and internal tooth flank from the reference meshing tooth.
$f(m, \alpha, z_1, z_2, x_1, x_2, a)$: Function having variables of, $\alpha$, $z_1$, $z_2$, $x_1$, $x_2$, a.
m: Module.
$z_1$, $z_2$: Number of teeth.
$\alpha$: Reference pressure angle.
$x_1$, $x_2$: Addendum modification coefficient.
a: Distance between the centers.

$X_{2,i}, Y_{2,i}$: The i-th internal tooth meshing point coordinate (X,Y) when the i-th internal tooth from the reference meshing tooth joins the meshing operation in the O-XY coordinate with the center "O" of the internally toothed gear wheel as the reference point.

$X_{1,i}, Y_{1,i}$: The i-th external tooth meshing point coordinate (X,Y) when the i-th external tooth from the reference meshing tooth joins the meshing operation in the O-XY coordinate with the center "O" of the internally toothed gear wheel as the reference point.

The first term in the formula (2) represents the elastic deformation amount extending in a circumferential direction of one of the internal tooth body and the external tooth body and the first term in the formula (3) represents the elastic deformation amount contracting in a circumferential direction of the other of the internal tooth body and the external tooth body. In other words, the formula (1) indicates the total displacement amount of the displacement amount of one of the internal tooth and the external tooth in an extending direction and the displacement amount of the other of the internal tooth and the external tooth in a contracting direction agrees to the gap value between the external tooth tip and the internal tooth flank when the internal tooth body and the external tooth body are elastically deformed either in extending or contracting direction in a circumferential direction. By designing the internally toothed gear wheel and the externally toothed gear wheel using the formula (1), the effects or the performance of the invention explained above can be surely achieved.

Further, it may be that the module of each of the internally toothed gear wheel and the externally toothed gear wheel is set as the value satisfied the formula (1) or less than the value thereof, wherein the number "i" satisfies the condition "i=2". The condition that satisfies "i=2" in the formula (1) means the condition that an internal tooth and an external tooth each neighboring to the reference meshing tooth are in contact with each other. Accordingly, the number of meshing teeth is counted as at least two.

Further, it is preferable to design the module size of the internally toothed gear wheel and the externally toothed gear wheel as small as possible in order to increase the number of meshing teeth by elastically deforming the external tooth body and the internal tooth body in a circumferential direction. By downsizing the module, the tooth height of the internal tooth and the external tooth can be shortened to, thereby, reduce the deflection amount of the internal tooth and the external tooth. Thus, an undesired contact of the tooth tip of the internal and external teeth with the mating tooth flank can be prevented. In other words, high surface pressure problem caused by the contact of the tooth tip can be prevented and accordingly, the load to be received by the external and the internal teeth can be increased to be able to transmit a further larger torque as an entire structure due to the decrease of surface pressure generated between the external tooth and the internal tooth.

The load generated at the internal tooth body and the external tooth body becomes smaller when the bodies retreat in a circumferential direction from the internal tooth and the external tooth meshing with each other under the non-driving condition, defined as the reference meshing tooth. In other words, the internal tooth body and the external tooth body are greatly elastically deformed in extending or contracting direction, when positioned closer to the reference tooth in the circumferential direction. According to the invention, since the size of the module can be downsized, the number of the external teeth and the internal teeth becomes large. In other words, the pitch between the neighboring external teeth and the pitch between the neighboring internal teeth become narrow. Then, a number of internal and the external teeth can be positioned at the location closer to the reference tooth in a circumferential direction. Accordingly, a number of such internal and the external teeth may join the gear meshing engagement. As stated, by minimizing the size of the module, the condition that a plenty of the internal and external teeth can join the meshing engagement can be created as the result.

Further, by minimizing the size of module, the involute tooth profile of the internal and external teeth can be shaped to be rather in a shape of a straight line. This may increase the contact surface area between the internal and external teeth thereby reducing the surface pressure generated at the internal and external teeth. Accordingly, further high torque transmission can be achieved as the total structure of internally toothed gear wheel and the externally toothed gear wheel. Further, by minimizing the size of the module, the gap between the flanks of the neighboring internal and the external teeth can be also minimized. In this aspect too, can increase the number of internal and external teeth which can join the meshing engagement.

Further, by decreasing the surface pressure to be received by each tooth, under some cases, the heat treatment process may be eliminated, which has been considered to be an inevitable process for the gear teeth manufacturing. Conventionally, in order to strengthen the pressure durability, the heat treatment has been conducted. However, according to the invention, by reducing the surface pressure, there may be cases where the pressure durability level is within the permissible range without conducting any heat treatment process. This can reduce the cost of manufacturing gear. Furthermore, by setting the module which satisfies the condition that the value "i" equals to 2 (i=2), the number of meshing teeth surely is counted as at least two or more. Thus the effects and performance stated above can be sure to be achieved.

[First Rotation Driving Device]

The rotation driving device includes a motor having a cylindrically shaped rotor and a cylindrically shaped stator disposed opposite to the rotor outwardly in a radial direction thereof, the swing internal contact type planetary gear device, and a shaft transmitting a rotation of the motor to the eccentric body of the swing internal contact type planetary gear device. The eccentric body includes a first eccentric body having a center line being a first eccentric axial line, the first eccentric axial line deviated from the input/output axial line, and a second eccentric body having a center line being a second eccentric axial line, the second eccentric axial line deviated from the input/output axial line in a different direction from the direction of the first eccentric axial line. The externally toothed gear wheel includes a first externally toothed gear wheel relatively rotatably supported on the first eccentric body, and a second externally toothed gear wheel relatively rotatably supported on the second eccentric body. The shaft includes a rotor fitting portion for receiving at an outer circumferential surface thereof the rotor which is formed separately from the rotor fitting portion, a first eccentric body portion formed integrally with the first eccentric body, and a second eccentric body portion formed integrally with the second eccentric body at the opposite side of the rotor fitting portion relative to the first eccentric body. A circle of an outer circumferential surface of the second eccentric body portion is formed to be smaller than the outer diameter of a circle of an outer circumferential surface of the first eccentric body portion and is positioned inside of the circle of the outer circumferential surface of the first eccentric body portion when viewed from an axial direction of the shaft.

Since the rotation driving device uses the swing internal contact type planetary gear device, the structure has the effects stated above. Further, since the eccentric body of the swing internal contact type planetary gear device in the rotation driving device and the shaft which transmits rotation driving torque of the rotor are formed integrally, the number of parts can be reduced and also the overall size can be reduced. However, in this integrally formed shaft of the rotor and the eccentric body, if the plural number of the eccentric body is formed (such as first eccentric body portion and the second eccentric body portion), it would be very difficult to install the bearings into the first and the second eccentric portions.

Accordingly, by reducing the outer diameter of the second eccentric body portion to be smaller than the outer diameter of the first eccentric body portion, the outer circumferential surface of the second eccentric body portion positions inside of the outer circumferential surface of the first eccentric body portion when viewed from the axial direction of the shaft. Thus the bearing to be installed at the outer circumferential surface of the first eccentric body portion can be easily inserted into the first eccentric body portion passing through the second eccentric body portion.

[Second Rotation Driving Device]

The rotation driving device includes a motor having a cylindrically shaped rotor and a cylindrically shaped stator disposed opposite to the rotor outwardly in a radial direction thereof, the swing internal contact type planetary gear device, and a shaft transmitting a rotation of the motor to the eccentric body of the swing internal contact type planetary gear device. The eccentric body includes a first eccentric body having a center line being a first eccentric axial line, the first eccentric axial line deviated from the input/output axial line, and a second eccentric body having a center line being a second eccentric axial line, the second eccentric axial line deviated from the input/output axial line in a different direction from the direction of the first eccentric axial line. The externally toothed gear wheel includes a first externally toothed gear wheel relatively rotatably supported on the first eccentric body, and a second externally toothed gear wheel relatively rotatably supported on the second eccentric body. The shaft includes a rotor fitting portion for receiving at an outer circumferential surface thereof the rotor which is formed separately from the rotor fitting portion, a first eccentric body portion formed integrally with the first eccentric body, a second eccentric body portion formed integrally with the second eccentric body at the opposite side of the rotor fitting portion relative to the first eccentric body, and a groove portion formed between the rotor fitting portion and the first eccentric body portion in an axial direction, having a diameter smaller than an outer diameter of the rotor fitting portion and an outer diameter of the first eccentric body portion, and having a width in an axial direction wider than a width in an axial direction of a first bearing which supports the first externally toothed gear wheel relative to the first eccentric body portion.

As another means taken different from the means above, by forming a rotor and a rotor fitting portion separately at the portion where the rotor of the motor is disposed, a bearing to be installed at the outer circumferential surface of the first eccentric body portion positioned at the motor side can be inserted from the motor side. By providing a groove portion between the first eccentric body portion and the rotor fitting portion with a proper length outer diameter and a width in an axial direction, the bearing can be inserted from the motor side and installed at the outer circumferential surface of the first eccentric body portion.

BRIEF EXPLANATION OF THE ATTACHED DRAWINGS

Figure 3:
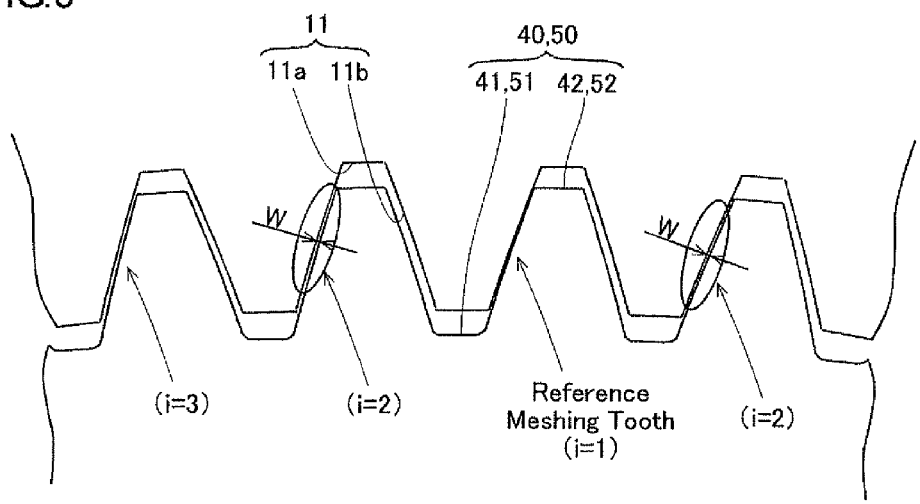

FIG. 3 indicates each position of a portion of the internal tooth and the first and the second external teeth showing the meshing condition of the internal and the external teeth under the non-driving condition.

Figure 4:
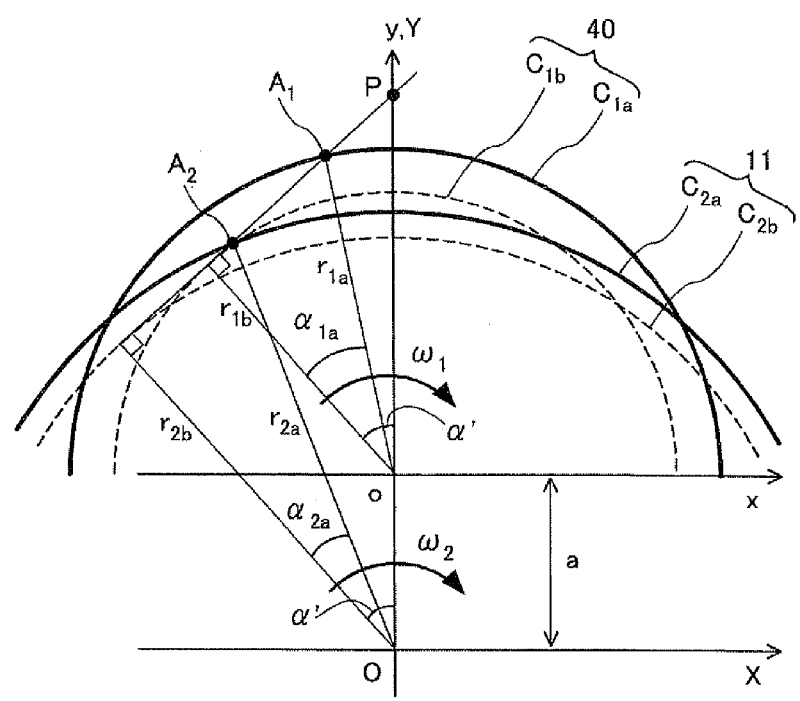

FIG. 4 is a view showing the dimensions of the internal tooth and the first and the second external teeth.

Figure 5:
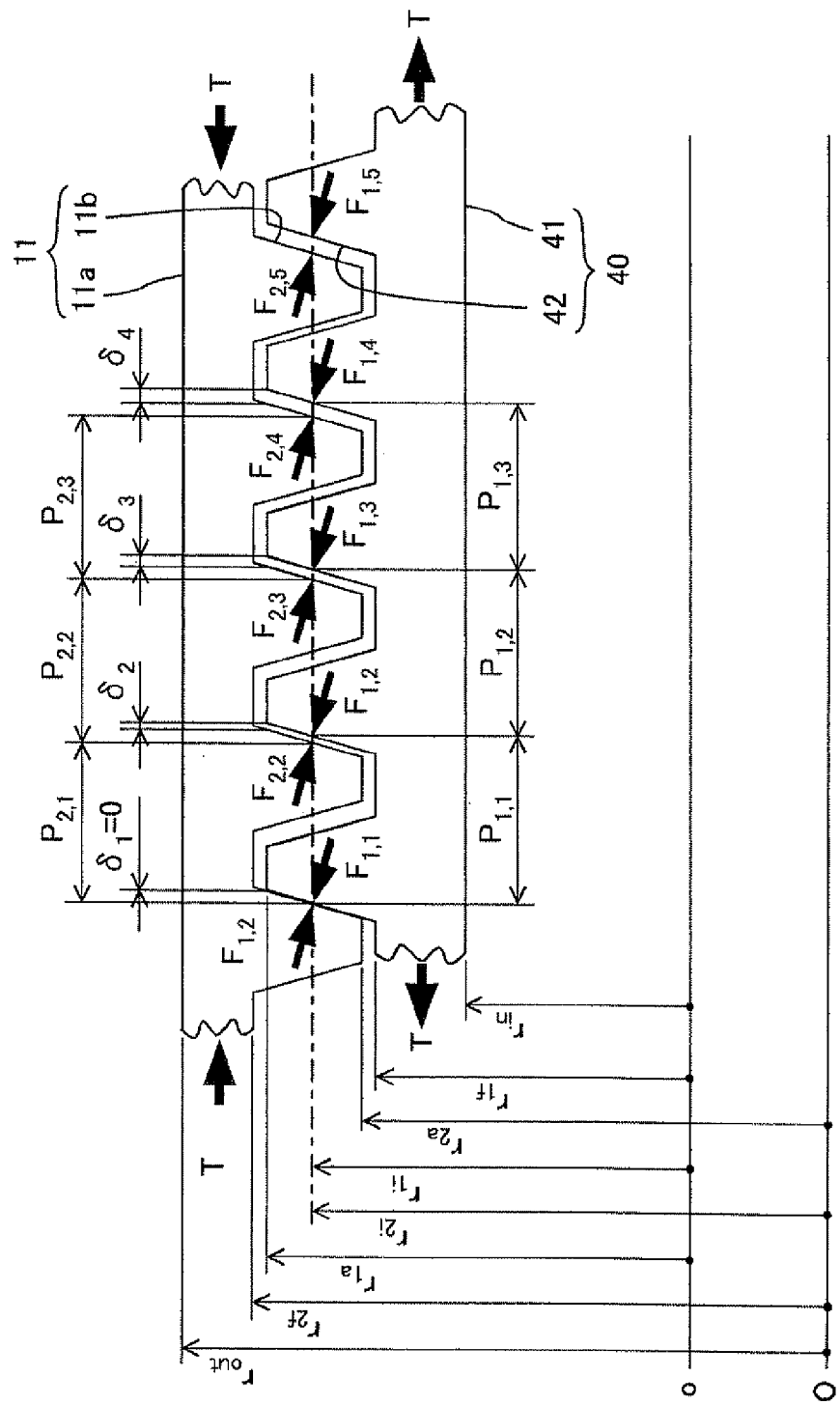

FIG. 5 is a partial exploded view of the internal tooth and the first and the second external teeth.

Figure 6:
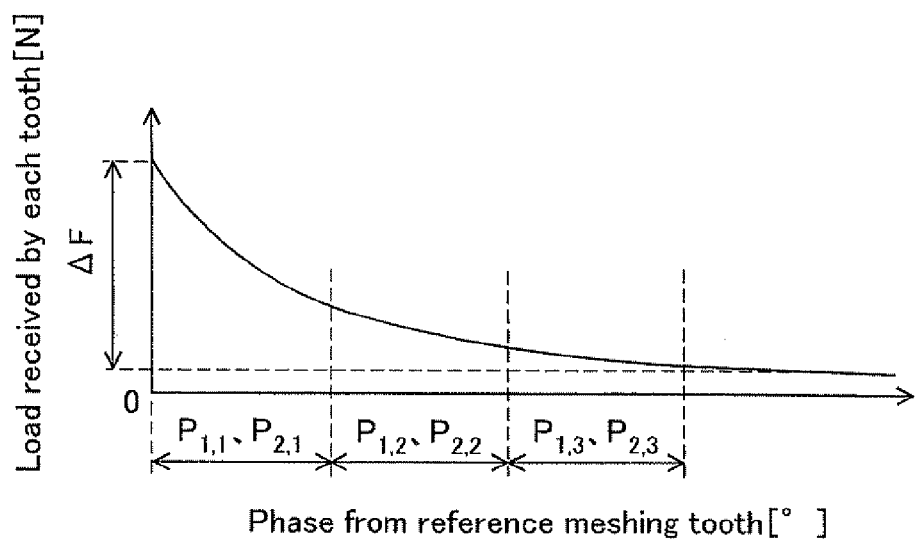

FIG. 6 is a view showing the performance of the load applied on each tooth phase from the reference meshing tooth.

Figure 7:
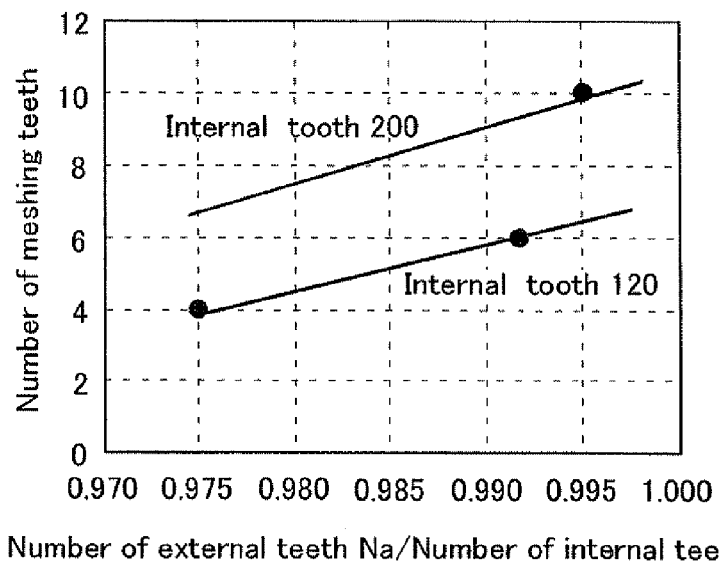

FIG. 7 indicates the FEM analysis result showing the number of meshing teeth corresponding to the ratio value between the first and the second external teeth and the internal tooth.

Figure 8:
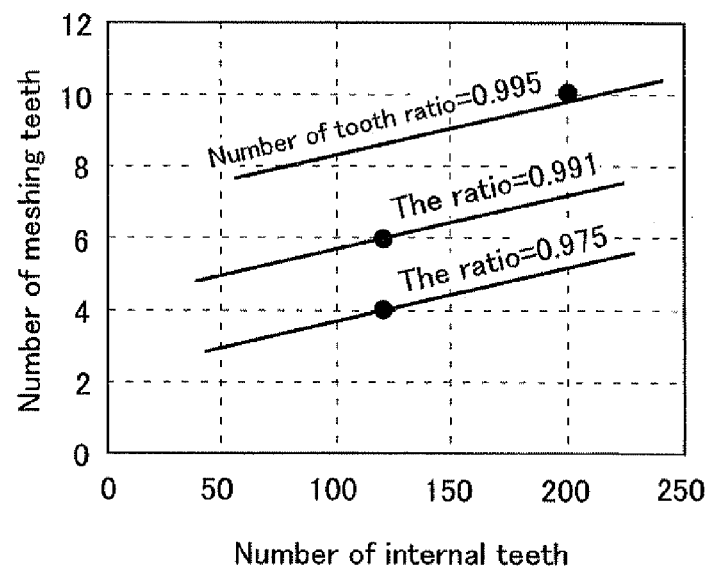

FIG. 8 indicates the FEM analysis result showing the number of meshing teeth relative to the number of internal teeth.

Figure 9:
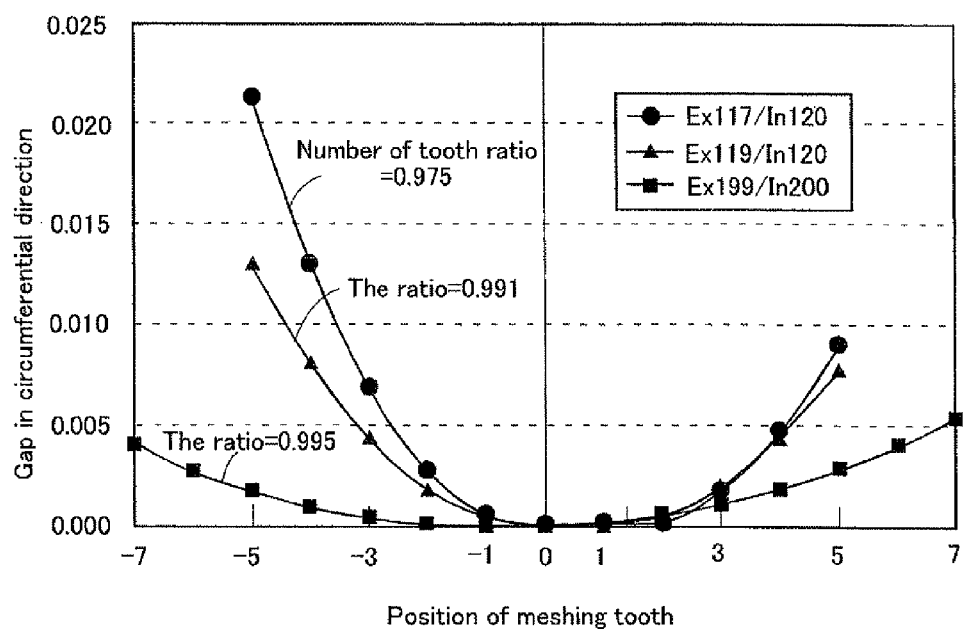

FIG. 9 indicates the FEM analysis result showing a circumferential gap between the internal tooth and the first and the second external teeth relative to the position of the meshing tooth.

Figure 10:
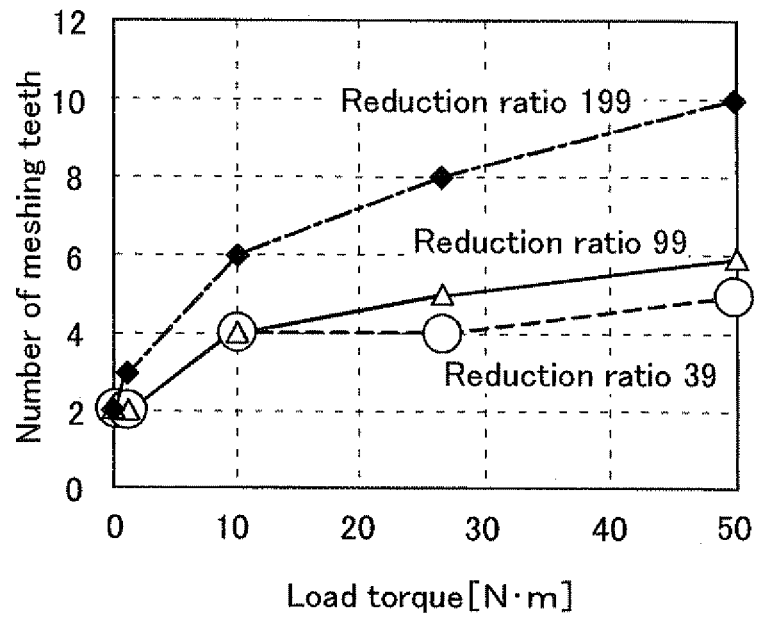

FIG. 10 indicates the FEM analysis result showing the number of meshing teeth relative to the load torque.

Figure 11:
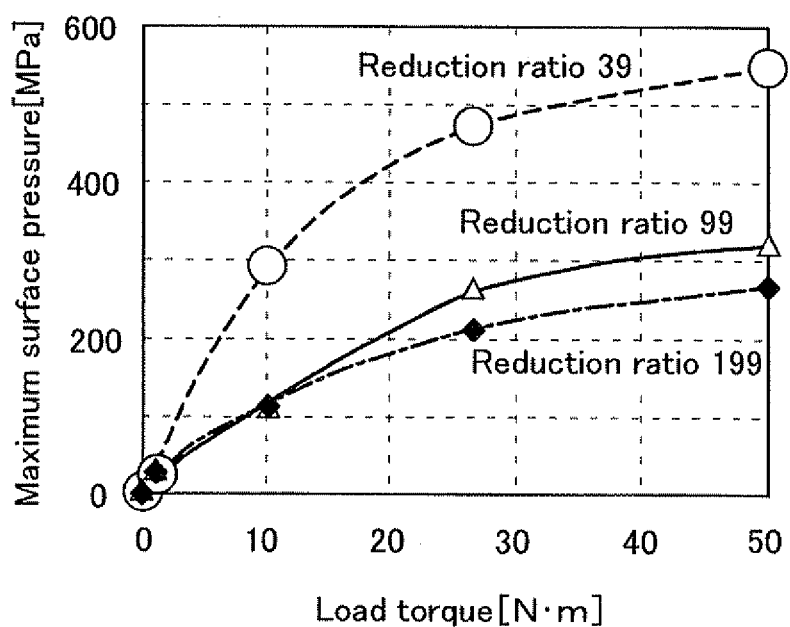

FIG. 11 indicates the FEM analysis result showing the maximum surface pressure relative to the load torque.

Figure 12:
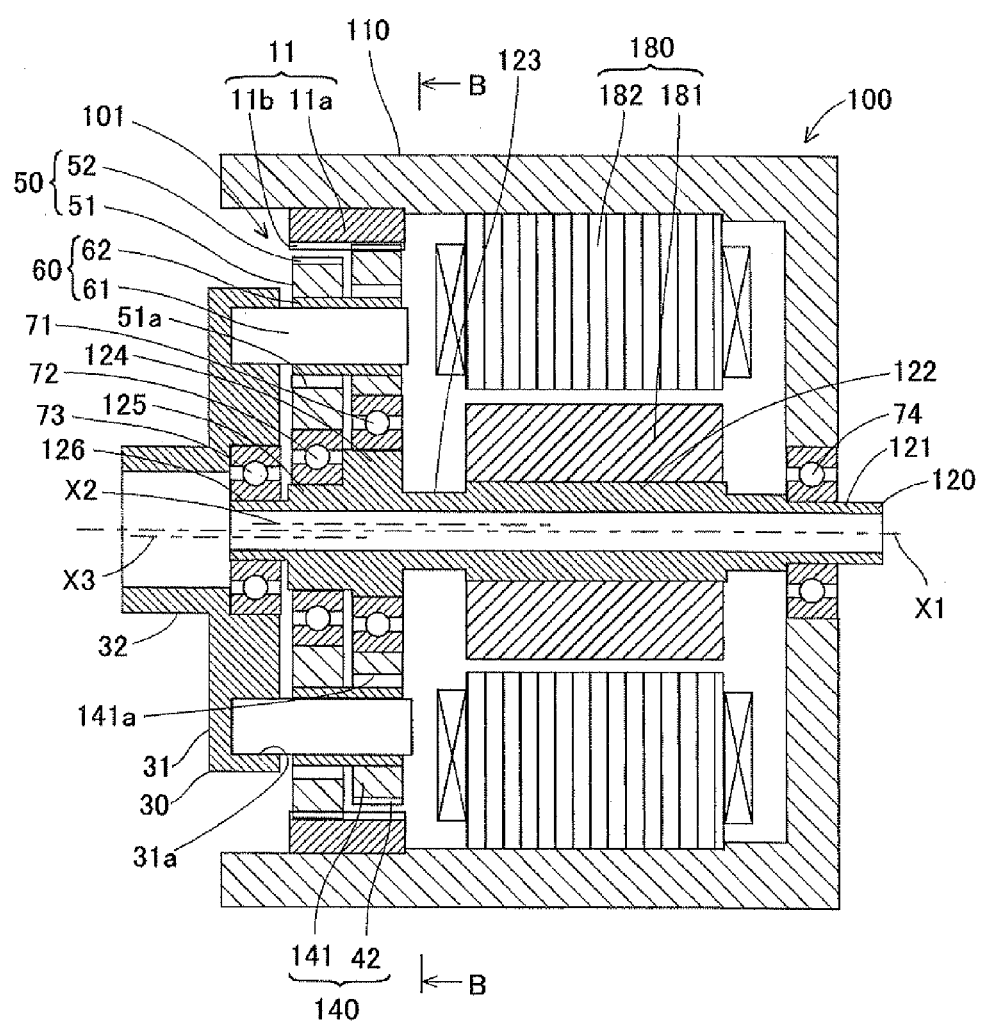

FIG. 12 (second embodiment) is an axial cross sectional view of the rotation driving device.

Figure 13:
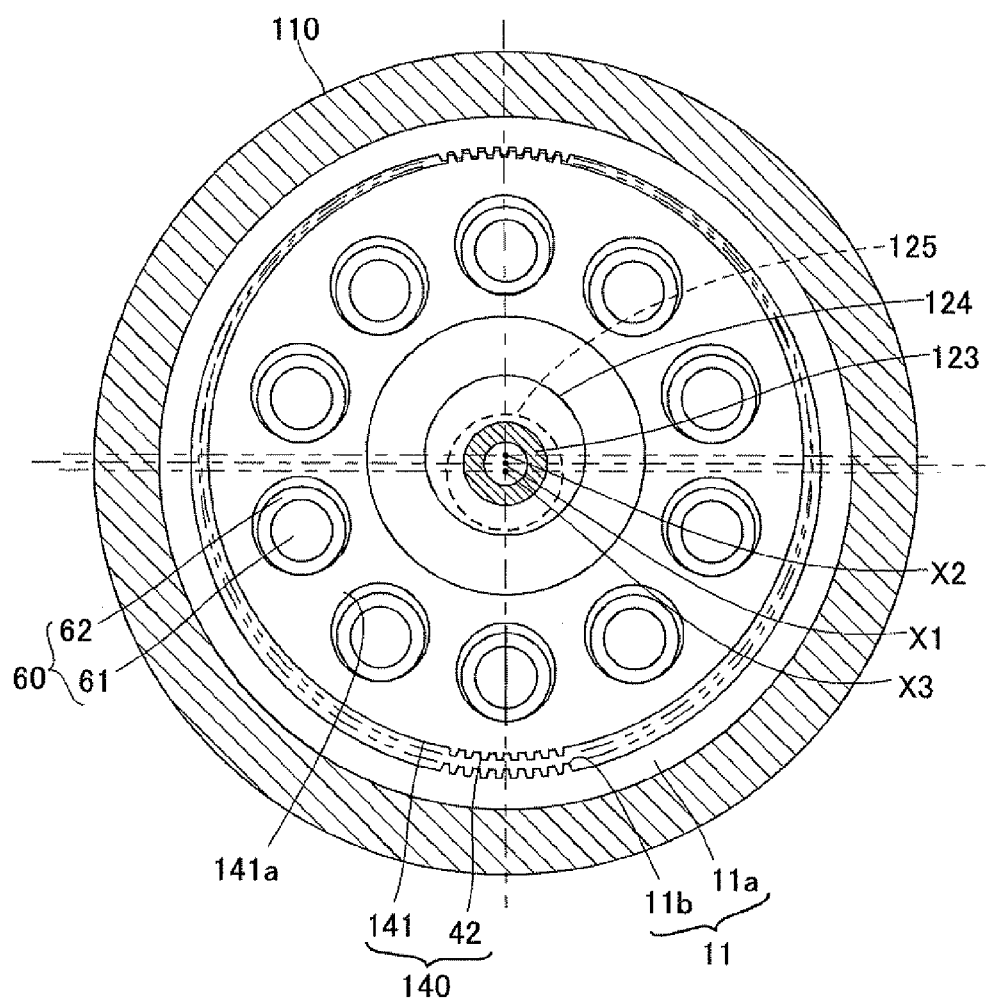

FIG. 13 is a cross sectional view taken along the line B-B of FIG. 12.

Figure 14:
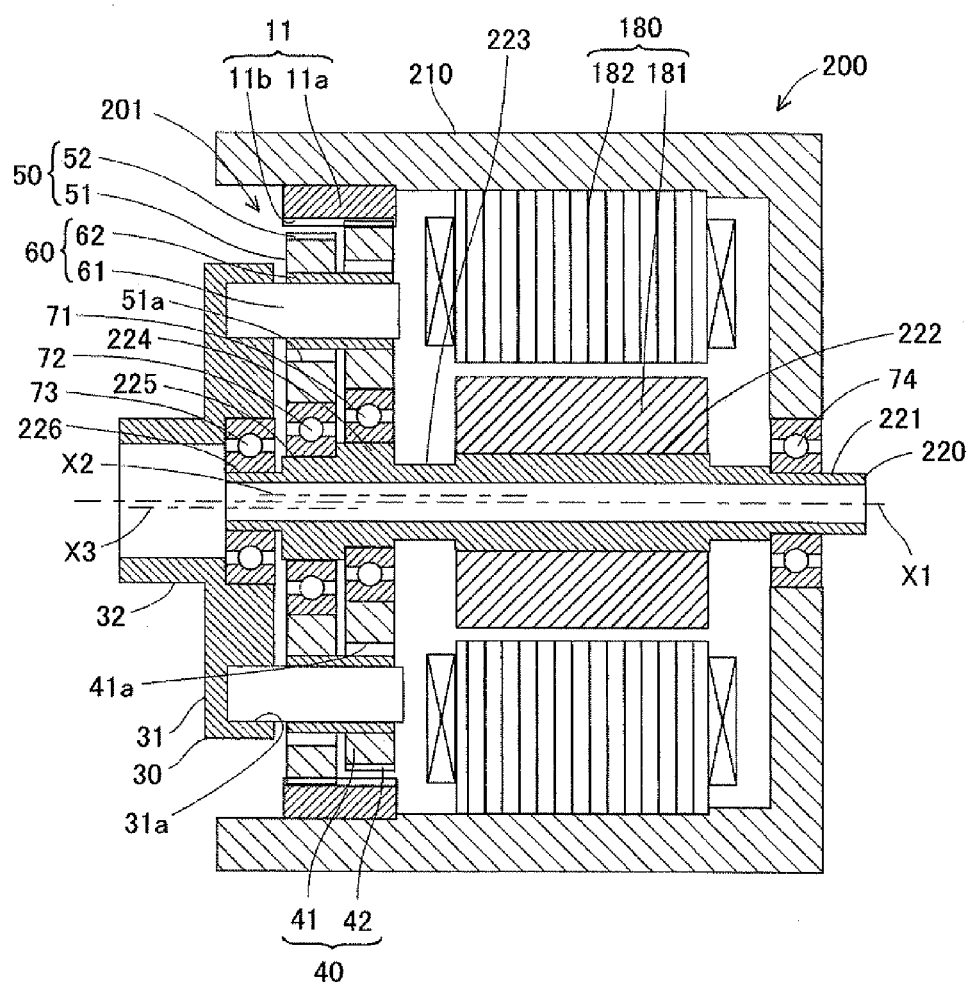

FIG. 14 (third embodiment) is an axial cross sectional view of the rotation driving device.

Figure 15:
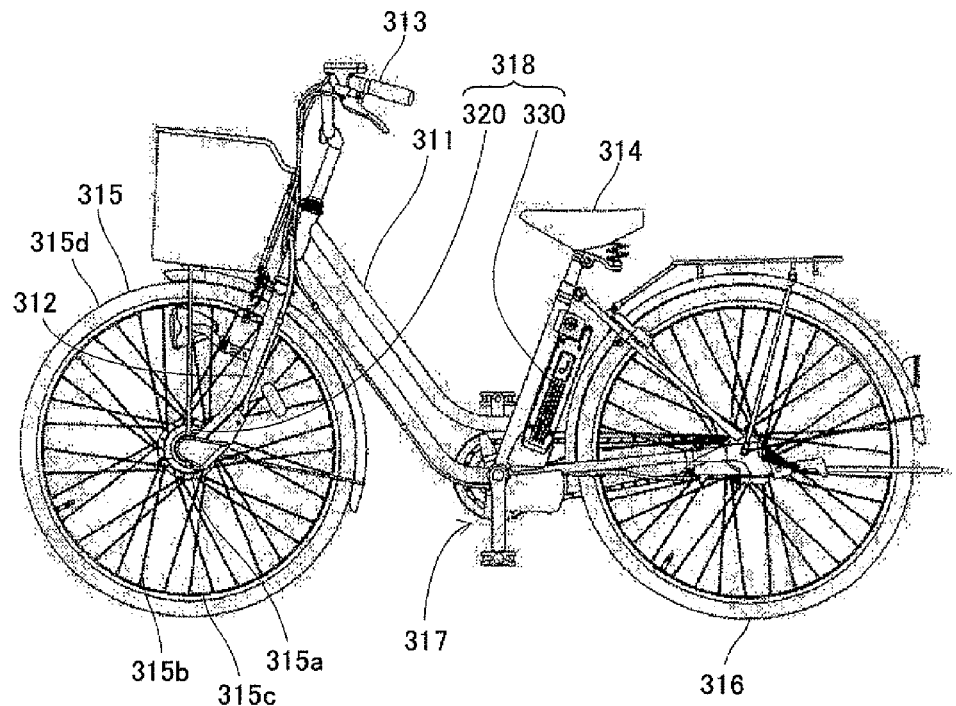

FIG. 15 (fourth embodiment) shows an electrically assisted bicycle.

Figure 16:
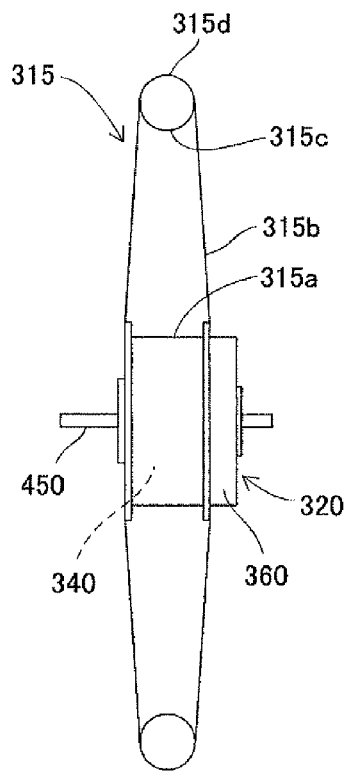

FIG. 16 is an enlarged view of the front wheel of the electrically assisted bicycle viewed from the direction orthogonal to the axis of the wheel.

Figure 17:
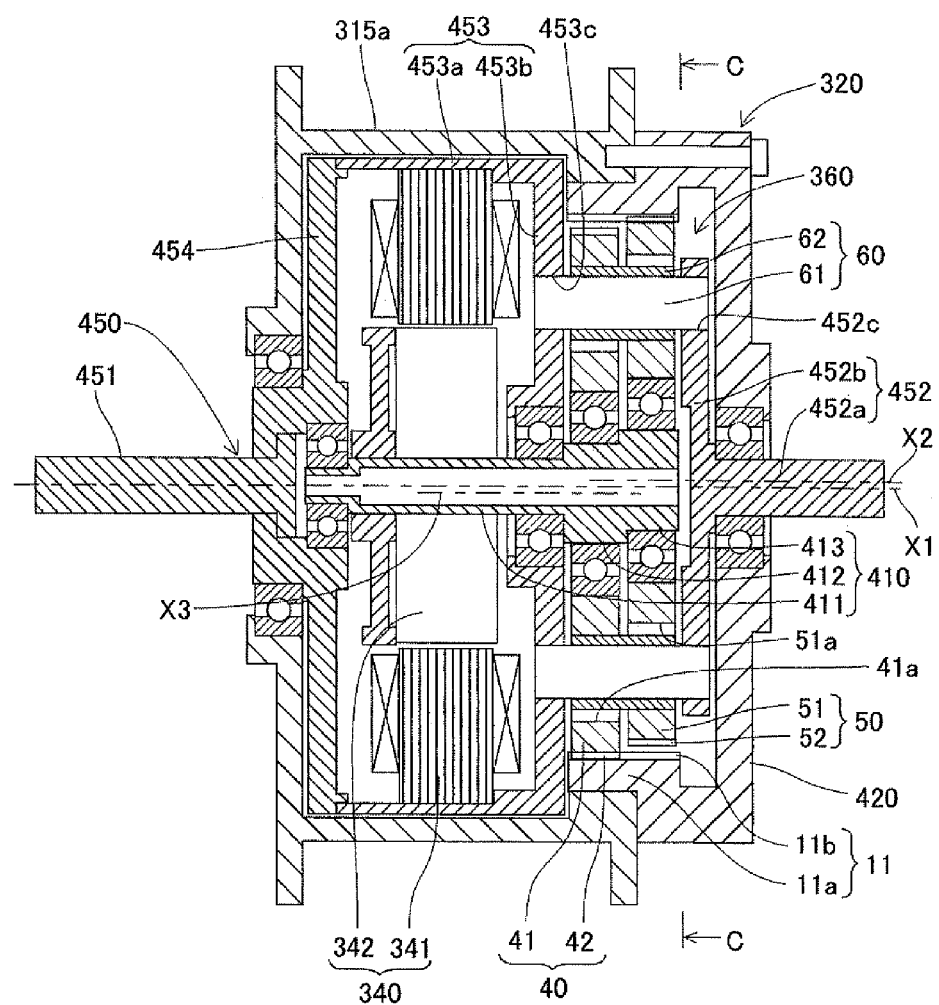

FIG. 17 is an axial cross sectional view of the driving device provided at the hub of the front wheel of the electrically assisted bicycle.

Figure 18:
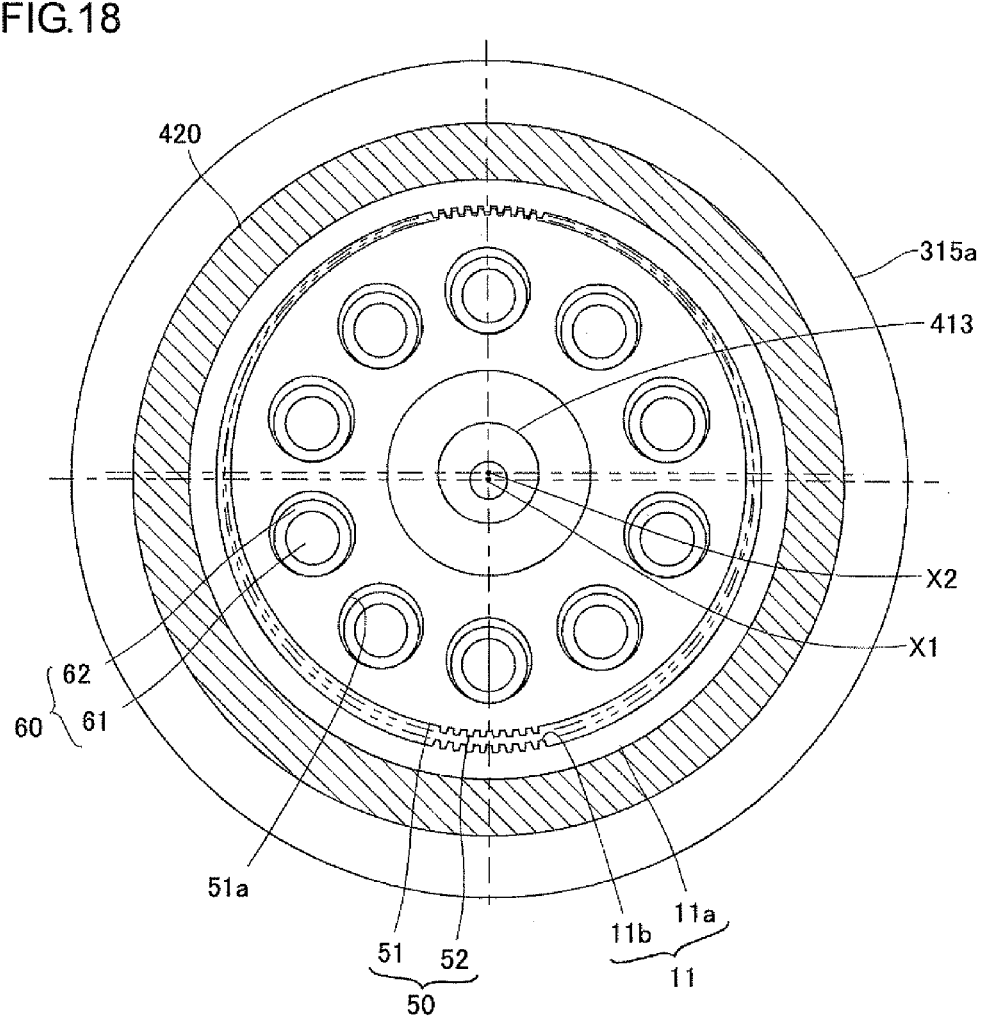

FIG. 18 is a cross sectional view taken along the line C-C of FIG. 17.

PREFERRED EMBODIMENTS OF THE INVENTION

1. First Embodiment 1-1. Structure of Swing Internal Contact Type Planetary Gear Device The structure of the swing internal contact type planetary gear device 1 of the embodiment will be explained hereinafter with reference to the attached drawings, FIG. 1 and FIG. 2. The swing internal contact type planetary gear 1 functions as a speed reduction gear device having an input shaft 20 and an output shaft 30 provided co-axially with the input shaft and transmits rotation of the input shaft 20 to the output shaft 30 by reducing the rotational speed of the input shaft. This speed reduction gear device can be also used as a speed increase gear device by reversing the input/output rotation between the input shaft 20 and the output shaft 30.

The swing internal contact type planetary gear device 1 is summarized by the device which includes an internally toothed gear wheel 11 formed at an inner circumferential surface of the housing 10 and the first external tooth 40 and the second external tooth 50 are swingably rotated relative to the housing 10 by the rotation of the input shaft 20. The rotation difference generated by the relative rotation between the internally toothed gear wheel 11 and the first and the second externally toothed gear wheels is outputted to the output shaft 30.

Detail of the swing internal contact type planetary gear device 1 will be explained hereinafter. The swing internal contact type planetary gear device 1 is formed by the housing 10, the input shaft 20, the output shaft 30, the first and the second externally toothed gear wheels 40 and 50 and a plurality of inner pins 60.

The housing 10 is formed with a cylindrical shape having a bottom surface. The housing 10 accommodates therein a tip end side of the input shaft 20, a base end side of the output shaft 30 and the first and the second externally toothed gear wheels 40 and 50. The bottom surface of the housing 10 is provided with a circular bore centering on the input/output axial line X1 and a fourth bearing 74 is inserted into the bore.

An internally toothed gear wheel 11 is provided on the inner circumferential surface of the cylindrically shaped portion of the housing 10. The internally toothed gear wheel 11 may be formed integrally with the housing 10 or may be separately formed and thereafter attached to the housing 10. The internally toothed gear wheel 11 is formed with an annular internal tooth body 11a and a plurality of internal teeth 11b integrally formed on the inner circumferential surface side of the internal tooth body 11a. The internally toothed gear wheel 11 is a gear wheel having the center on the input/output axial line X1. In other words, the central position of the pitch diameter accords to the input/output axial line X1. Further, the internal teeth 11b are formed of involute tooth profile and the internally toothed gear wheel 11 is formed by a steel material and normally formed through heat treatment process. It is noted here that the internal tooth 11b of the internally toothed gear wheel 11 receiving only a small surface pressure may be formed without heat treatment process.

The input shaft 20 is supported by the fourth bearing 74 which is inserted into the circular bore of the housing 10 and rotatable relative to the housing centering on the input/output axial line X1. The input shaft 20 is to be connected to a rotation driving source, such as a motor or an internal combustion engine and inputs the rotation driving force. The input shaft 20 is formed by a base end portion 21, first and second eccentric bodies 23 and 24 and a tip end portion 22, in order from the base end side (right side in FIG. 1). These elements are integrally formed with the input shaft 20.

The base end portion 21 is formed with a cylindrical shape or a columnar shape centering on the input/output axial line X1 as a central axis and is supported on the housing 10. The base end portion 21 is rotatable relative to the housing centering on the input/output axial line X1. The base end portion 21 is connected to the rotation driving source. The tip end portion 22 is provided at the tip end side (left side in FIG. 1) of the input shaft 20, i.e., at the output shaft 30 side. This tip end portion 22 is formed with a cylindrical shape or a columnar shape centering on the input/output axial line X1 as similar to the base end portion 21. A third bearing 73 is arranged on the outer circumferential surface of the tip end portion 22. The tip end portion 22 supports the output shaft 30 and is relatively rotatable therewith as will be explained later.

The first eccentric body 23 is formed with a hollow shaft shape or a solid shaft shape and includes a circular outer circumferential surface centering on the first eccentric axial line X2 which is deviated from the input/output axial line X1. The outer diameter of the first eccentric body 23 is set to be larger than the outer diameter of the base end portion 21 in this embodiment. The first eccentric body 23 is positioned in the base end side (right side in FIG. 1) in an axial direction from the axial center of the internally toothed gear wheel 11 formed on the housing 10.

The second eccentric body 24 is positioned in the tip end side (left side in FIG. 1) of the input shaft 20 in further tip end side than the position of the first eccentric body 23. This second eccentric body 24 is formed with a hollow shaft shape or a solid shaft shape and includes a circular outer circumferential surface centering on the second eccentric axial line X3 which deviated from the input/output axial line X1. The diameter of the second eccentric body 23 is set to be the same diameter as the first eccentric body 23. The phase of the second eccentric axial line X3 is deviated by 180 degree from the first eccentric axial line X2 relative to the input/output axial line X1 with an eccentric amount same as that of the first eccentric axial line X2. The second eccentric body 24 is positioned in the tip end side (left side in FIG. 1) in an axial direction from the axial center of the internally toothed gear wheel 11 formed on the housing 10. Accordingly, when the input shaft 20 rotates centering on the input/output axial line X1, the first and the second eccentric bodies 23 and 24 of the input shaft 20 are orbiting the input/output axial line X1.

The output shaft 30 is supported on the housing 10 and the input shaft 20 by a bearing (not shown) which is inserted into the housing 10 and a third bearing 73 which is inserted into the outer circumferential surface of the tip end portion 22 of the input shaft 20 and is rotatable relative to the housing 10 and the input shaft 20 centering on the input/output axial line X1. This output shaft 30 is positioned at more left side in FIG. 1 than the position of the input shaft 20 and includes a flange portion 31 and a shaft portion 32. The flange portion 31 is formed with a disc shape having a circular bore in the center thereof. The inner circumferential surface of the flange portion 31 is rotatably supported on the tip end portion 22 of the input shaft 20 through the third bearing 73. Further, a plurality of circular recessed portions 31a are provided at one end surface of the flange portion 31 in a circumferential direction about the input/output axial line X1 with an equal interval with one another. In other words, each circular central position of the circular recessed portions 31a is positioned on the concyclic point about the input/output axial line X1. According to this embodiment, the number of circular recessed portion 31a is exampled as ten (10). The shaft portion 32 of the output shaft 30 is integrally formed on the other end surface (left end surface in FIG. 1) of the flange portion 31 and coaxial therewith. The shaft portion 32 is formed with a cylindrical or a columnar shape centering on the input/output axial line X1.

The first externally toothed gear wheel 40 is formed with a disc shape having a circular bore at the center thereof. The inner circumferential surface of the first externally toothed gear wheel 40 is inserted into the outer circumferential surface of the first eccentric body 23 of the input shaft 20 through the first bearing 71. In other words, the first externally toothed gear wheel 40 is supported on the first eccentric body 23 and rotatable relative thereto centering on the first eccentric axial line X2. Due to the eccentricity of the first eccentric body 23 relative to the input/output axial line X1, the first externally toothed gear wheel 40 orbits the input/output axial line X1 in the housing 10 and at the same time rotates about the first eccentric axial line X2.

The first externally toothed gear wheel 40 includes an annular first external tooth body 41 and a plurality of first external teeth 42 formed integrally with the first external tooth body 41 at the outer circumferential surface side thereof. In other words, the first externally toothed gear wheel 40 is a gear wheel having a center line being the first eccentric axial line X2. Accordingly, the pitch circle center position of the first external tooth 42 accords to the first eccentric axial line X2. Further the first external tooth 42 is formed with an involute tooth profile. The pitch diameter of the first externally toothed gear wheel 40 is set to be smaller than the pitch diameter of the internally toothed gear wheel 11 formed on the housing 10 by the amount of eccentricity of the first eccentric axial line X2 relative to the input/output axial line X1. Accordingly, the first externally toothed gear wheel 40 is in meshing relationship with the internally toothed gear wheel 11, partially inscribing the internally toothed gear wheel 11. In other words, the first externally toothed gear wheel 40 swingably and relatively rotatably engages with the internally toothed gear wheel 11 with meshing engagement therewith.

The axial width of the first externally toothed gear wheel 40 is set to be the value half of the length of the axial width of the internally toothed gear wheel 11. Further, the first externally toothed gear wheel 40 engages with the half of the internally toothed gear wheel 11 at one side (right side in FIG. 1) in an axial direction. Further, the first externally toothed gear wheel 40 is formed with the same material with the internally toothed gear wheel 11.

Further, a plurality of circular through-holes 41a is provided in an equal interval with one another at the center of the first external tooth body 41 in a radial direction circumferentially centering on the first eccentric axial line X2. In other words, each circular center position of the circular through-holes 41a positions at concyclic point about the first eccentric axial line X2. The number of the circular through-holes 41a is the same as the number of circular recessed portions 31a formed on the flange portion 31. The inner diameter of the circular through-hole 41a is set to be larger than the inner diameter of the circular recessed portion 31a and as viewed from the axial direction of the input/output axial line X1, the respective circular through-holes 41a are formed and positioned so that the entire portion of the respective circular recessed portions 31a formed on the flange portion 31 corresponding respectively to the circular through-holes 41a can be visually observed.

The second externally toothed gear wheel 50 is formed with the same material as the first externally toothed gear wheel 40 and the same heat treatment is conducted. In other words, the second externally toothed gear wheel 50 includes an annular second external tooth body 51 and a plurality of second external teeth 52 formed integrally with the second external tooth body 51 at the outer periphery side thereof. The inner circumferential surface of the second external tooth body 51 is inserted into the outer periphery side of the second eccentric body 24 of the input shaft 20 through the second bearing 72. In other words, the second externally toothed gear wheel 50 is rotatably supported on the second externally toothed gear wheel 50 centering on the second eccentric axial line X3. Further, since the second eccentric body 24 is deviated from the input/output axial line X1, the second externally toothed gear wheel 50 is provided to orbit the input/output axial line X1 and rotates about the second eccentric axial line X3. In other words, the second externally toothed gear wheel 50 is a gear wheel having a center line being the second eccentric axial line X3 and accordingly, the center position of the pitch circle of the second external teeth 52 agrees to the second eccentric axial line X3.

Thus, the second externally toothed gear wheel 50 has a partially inscribing engagement relationship with the internally toothed gear wheel 11. In other words, the second externally toothed gear wheel 50 engages with the internally toothed gear wheel 11 and rotates relatively and swingably relative to the internally toothed gear wheel. Further, the width in an axial direction of the second externally toothed gear wheel 50 is set to be the half of the width in axial direction of the internally toothed gear wheel 11. The second externally toothed gear wheel 50 meshes with the half of the other side (left side in FIG. 1) in an axial direction of the internally toothed gear wheel 11.

Further, a plurality of circular through-holes 51a is provided in an equal interval with one another at the center of the second external tooth body 51 in a radial direction circumferentially centering on the second eccentric axial line X3. In other words, each circular center position of the circular through-holes 51a positions at concyclic point about the second eccentric axial line X3. The number of the circular through-holes 51a is the same as the number of circular recessed portions 31a formed on the flange portion 31. The inner diameter of the circular through-hole 51a is set to be larger than the outer diameter of the circular recessed portion 31a and as viewed from the axial direction of the input/output axial line X1, the respective circular through-holes 51a are formed and positioned so that the entire portion of the respective circular recessed portions 31a formed on the flange portion 31 corresponding respectively to the circular through-holes 41a can be visually observed.

Figure 1:
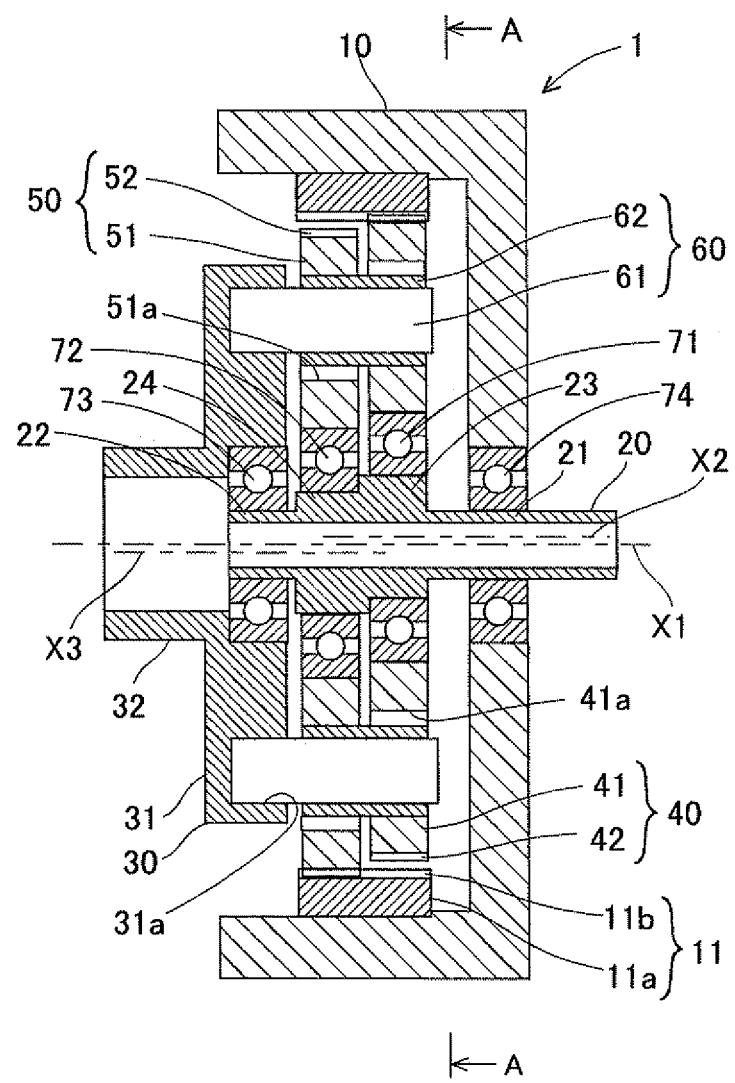
FIG. 1 (first embodiment) is an axial cross sectional view of the swing internal contact type planetary gear device.
Figure 2:
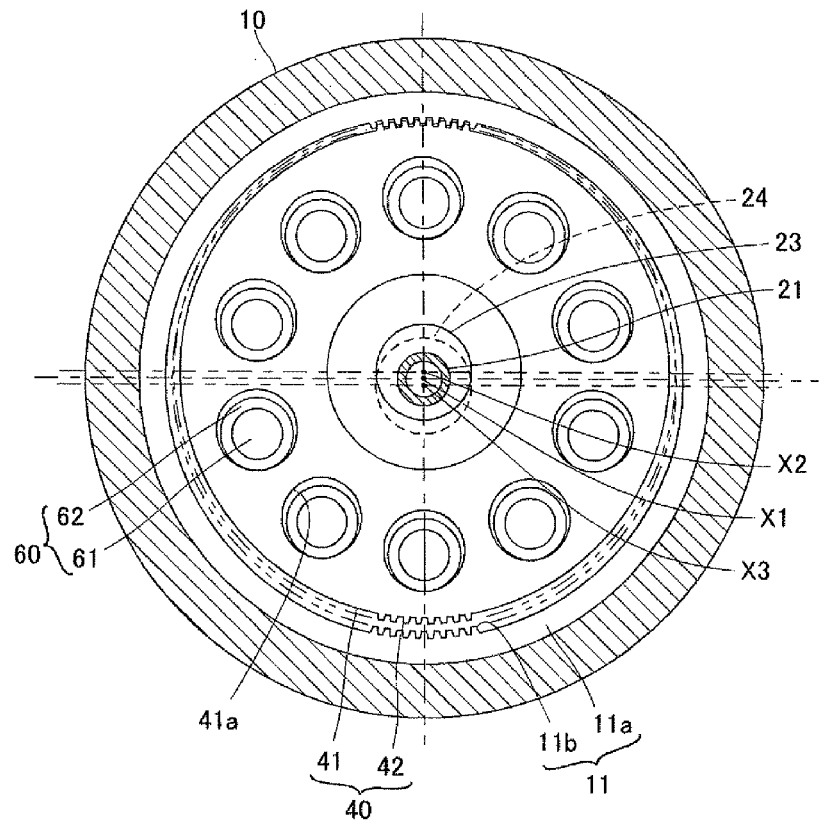
FIG. 2 is a cross sectional view taken along the line A-A of FIG. 1.

Each inner pin 60 is formed by a pin body 61 and a sliding bearing 62 formed with a cylindrical shape and inserted into the pin body 61. The pin body 61 is inserted into the circular recessed portion 31a formed on the flange portion 31 of the output shaft 30 and is projecting in an axial direction from the one end surface (right end surface in FIG. 1) of the flange 31. The pin body 61 is formed to be penetrating through the circular through-holes 41a and 51a formed respectively on the first and the second external tooth bodies 41 and 51. The sliding bearing 62 is inserted into the outer periphery of the pin body 61. The outer diameter of the sliding bearing 62 is set to be smaller than the inner diameter of each circular through-hole 41a and 51a. As shown in FIGS. 1 and 2, a portion of the outer circumferential surface of the sliding bearing 62 is in contact with a portion of the inner circumferential surface of the circular through-holes 41a and 51a. In response to the rotational movement of the input shaft 20, the contact portion between the sliding bearing 62 and the circular through-holes 41a and 51a moves.

1-2. Operation of Swing Internal Contact Type Planetary Gear Device

The operation of thus structured swing internal contact type planetary gear device 1 will be explained hereinafter. First, when the rotation driving force is transmitted to the input shaft 20 from the rotation driving source such as a motor or an internal combustion engine, the input shaft 20 is rotated about the input/output axial line X1. In response to this rotation of the input shaft 20, the first and the second eccentric bodies 23 and 24 respectively orbit the input/output axial line X1. The first externally toothed gear wheel 40 meshes with the internally toothed gear wheel 11 and rotates about the first eccentric axial line X2 by the amount corresponding to the difference in the number of teeth between the first external tooth 42 and the internal tooth 11b. On the other hand, the second externally toothed gear wheel 50 orbits the input/output axial line X1 in response to the orbiting movement of the second eccentric body 24. Then the second externally toothed gear wheel 50 meshes with the internally toothed gear wheel 11 and rotates about the second eccentric axial line X3 by the amount corresponding to the tooth difference between the second external tooth 52 and the internal tooth 11b.

It is noted here that the inner pin 60 is inserted into the circular through-holes 41a and 51a of the first and the second external tooth bodies 41 and 51, respectively. The sliding bearing 62 is in sliding contact with the inner circumferential surface of the circular through-holes 41a and 51a. Accordingly, each of the rotational components of the rotation of the first and the second externally toothed gear wheels 40 and 50 about the first and the second eccentric axial lines X2 and X3, respectively during the relative rotation between the first and the second externally toothed gear wheels 40 and 50 and the housing 10.

1-3. Concept of Structure of Internally Toothed Gear Wheel and First and Second Externally Toothed Gear Wheels Next, the outline structures of the internally toothed gear wheel 11 and the first and the second externally toothed gear wheels 40 and 50 will be explained in detail with reference to FIG. 3. The involute tooth profile is applied to the internal tooth 11b and the first and the second external teeth 42 and 52 as stated above. When the involute tooth profile is applied, the number of meshing is reduced and accordingly, the problem of stress concentration on the meshing teeth upon power transmission occurs. The inventors of this application focused on this point and studied deeply the tooth meshing condition between the internal tooth 11b and the first and the second external teeth 42 and 52 and further studied an appropriate structure of the internally toothed gear wheel 11 and the first and the second externally toothed gear wheels 40 and 50.

The important point is that by elastically deforming the internally toothed gear wheel 11 and the first and the second externally toothed gear wheels 40 and 50 under the rotation driving force being transmitting (this condition corresponds to the driving condition according to the invention), the number of meshing teeth has been increased. In more detail, the inventors has increased the number of meshing teeth by deforming the internal tooth body 11a and the first and the second external tooth bodies 41 and 51 in an extending or a contracting direction in a circumferential direction. In other words, by elastically deforming the internal tooth body 11a and the first and the second external tooth bodies 41 and 51 in a circumferential direction when the rotation driving force is transmitted between the internally toothed gear wheel 11 and the first and the second externally toothed gear wheels 40 and 50, the teeth which are not in meshing can be theoretically changed to the meshing teeth. Under the driving condition, by elastically deforming the internal tooth body 11a and the first and the second external tooth bodies 41 and 51, the number of meshing between the internal tooth 11b and the first and the second external teeth 42 and 52 is set to be larger than the number of meshing between the internal tooth 11b and the first and the second external teeth 42 and 52 under the rotation driving force being not transmitted (the condition corresponds to the non-driving condition according to the invention).

For this purpose, as shown in FIG. 3, under the non-driving condition, it is necessary to design the gap W in a circumferential direction between the non-meshing tooth flank of the internal tooth 11b and the tooth flanks of the first and the second external teeth 42 and 52 as small as possible. When the gap W in a circumferential direction between the tooth flank of the internal tooth 11b and the tooth flanks of the first and the second external teeth 42 and 52 becomes smaller than the total displacement value of the contracting direction displacement of the internal tooth 11b in a circumferential direction under the driving condition and the extending direction displacement of the first and the second external teeth 42 and 52 in a circumferential direction, the internal tooth 11b and the first and the second external teeth 42 and 52 are brought into contact and are changed to the meshing teeth under the driving condition.

1-4. Detail Design of Internally Toothed Gear Wheel and Externally Toothed Gear Wheels Next, a concrete design method concept for designing the structure of the above mentioned internally toothed gear wheel 11 and the first and the second externally toothed gear wheels 40 and 50 will be explained with reference to FIGS. 4 through 6. It is noted here that in order for simplifying the explanation, only the designing of the internally toothed gear wheel 11 and the first externally toothed gear wheel 40 will be explained. It is noted that the design of the second externally toothed gear wheel 50 is the same as that of the first externally toothed gear wheel 40.

First, the specifications of each tooth will be explained with reference to FIG. 4. The specifications of each tooth are defined as follows. Regarding to the first external tooth 42, suffix for each symbol is defined to be "1" and regarding to the internal tooth 11b, the suffix for each symbol is defined to be "2". Further, in FIG. 4, the pitch circle of the internal tooth 11b is defined to be "$c_{2a}$", the base circle thereof is defined to be "$c_{2b}$", and the pitch circle of the first external tooth 42 is defined to be "$c_{1a}$", and the base circle thereof is defined to be "$c_{1b}$".

[M5]

m: Module $z_1$ $z_2$: The number of teeth

α: Reference pressure angle $x_1$, $x_2$: Addendum modification coefficient $r_{1a}$ $r_{2a}$: Tooth tip circle radius Using the above specifications, the following tooth specifications are represented by the formulae (5) through (9).

[M6]

α': Meshing pressure angle $\alpha_{1x}$ $\alpha_{2x}$: Random circle pressure angle from base circle to tooth tip a: Center to center distance $r_1$, $r_2$: Pitch circle radius $r_{1b}$, $r_{2b}$: Base circle radius $r_{1x}$, $r_{2x}$: Random circle radius from base circle to tooth tip

[M7]

$$inv\alpha' = 2 \cdot \frac{x_2 - x_1}{z_2 - z_1} \cdot \tan \alpha + inv\alpha \qquad (5)$$

Wherein, $\text{inv}\alpha = \tan\alpha - \alpha$
inv( ): Involute function

[M8]

$$a = m \cdot \frac{z_2 - z_1}{2} \cdot \left(\frac{\cos\alpha}{\cos\alpha'} + 2\right) \quad (6)$$

[M9]

$$2 \cdot r_1 = m \cdot z_1 \quad (7)$$
$$2 \cdot r_2 = m \cdot z_2$$

[M10]

$$2 \cdot r_{1b} = m \cdot z_1 \cdot \cos\alpha \quad (8)$$
$$2 \cdot r_{2b} = m \cdot z_2 \cdot \cos\alpha$$

[M11]

$$\alpha_{1x} = \cos^{-1}\frac{r_{1b}}{r_{1x}} \quad (9)$$
$$\alpha_{2x} = \cos^{-1}\frac{r_{2b}}{r_{2x}}$$

Next, the theory for calculating the gap $\delta_1$ between the tooth flanks of the internal tooth 11b and the first external tooth 42 upon meshing engagement between the internally toothed gear wheel 11 and the first externally toothed gear wheel 40 will be explained with reference to FIG. 4 and FIG. 5. It is noted that in order to simplify the explanation, FIG. 5 shows a horizontally exploded view of the internal tooth 11b and the first external tooth 42 and that each tooth flank is figured as a straight line profile, not an involute profile. Further, the respective positions of the internal tooth 11b and the first external tooth 42 are indicated with suffix "i" as the tooth number. The tooth which number "i" is 1 (i=1) is the internal tooth 11b and the first external tooth 42 contacting with each other under the non-driving condition and this tooth number 1 is defined as the reference meshing tooth. The value of the tooth number "i" becomes increased number by one (1) by each in order of the tooth away from the reference meshing tooth in a circumferential direction.

First, the pressure angle $\alpha_i$ (meshing pressure angle) of each flank on the meshing line of the internal tooth 11b and the first external tooth 42 which are the "i-th" tooth from the reference meshing tooth is calculated according to the formula (10).

[M12]

$$\alpha_i = \tan^{-1}\left\{\frac{\sqrt{r_{1x}^2 + a^2 - 2 \cdot r_{1x} \cdot a \cdot \cos(\pi - (\alpha' - \alpha_{1x})) - r_{2b}^2} + (i-1) \cdot m \cdot \pi \cdot \cos\alpha}{r_{2b}}\right\} \quad (10)$$

$\alpha_i$: The i-th tooth pressure angle from the reference meshing tooth on the meshing line of the internally toothed gear wheel and the externally toothed gear wheel, wherein the reference meshing tooth is the tooth "i"=1.

Next, a coordinate point where the first external tooth 42 has a chance of joining the meshing engagement on the random circle from the base circle c1b of the first external tooth 42 to the tooth tip of the first external tooth 42 is calculated. The coordinate $(x_i, y_i)$ of the meshing point of the first external tooth 42 on the o-xy coordinate system having the center 0 of the first externally toothed gear wheel 40 as the reference point according to the formula (11).

[M13]

$$\begin{pmatrix} x_i \\ y_i \end{pmatrix} = \begin{pmatrix} -r_{1x} \cdot \sin(\alpha' - \alpha) \\ r_{1x} \cdot \cos(\alpha' - \alpha) \end{pmatrix} \quad (11)$$

$x_i, y_i$: The i-th tooth meshing point in the x, y coordinate when the i-th tooth from the reference meshing tooth joins the meshing engagement in the o-xy coordinate system referencing the center O of the externally toothed gear wheel.

The meshing point of the first external tooth 42 of the coordinate point $(x_i, y_i)$ is converted into the coordinate $(X_i, Y_i)$ of the O-XY coordinate system referencing the center O of the internally toothed gear wheel 11. This can be represented as the formula (12).

[M14]

$$\begin{pmatrix} X_{1,i} \\ Y_{1,i} \end{pmatrix} = \begin{pmatrix} x_i \cdot \cos\left(\frac{(n-1) \cdot 2 \cdot \pi}{z_1}\right) + y_i \cdot \sin\left(\frac{(n-1) \cdot 2 \cdot \pi}{z_1}\right) \\ -x_i \cdot \sin\left(\frac{(n-1) \cdot 2 \cdot \pi}{z_1}\right) + y_i \cdot \cos\left(\frac{(n-1) \cdot 2 \cdot \pi}{z_1}\right) + a \end{pmatrix} \quad (12)$$

$X_{1,i}, Y_{1,i}$: The i-th internal tooth meshing point in the x, y coordinate when the i-th external tooth from the reference meshing tooth joins the meshing engagement in the o-xy coordinate system referencing the center O of the externally toothed gear wheel.

Then, using the coordinate (x, y) of the meshing point of the first external tooth 42 calculated by the formula (12), the pressure angle $\alpha_{2,i}$ of the internal tooth 11b corresponding to each first external tooth 42 is calculated according to the formula (13). Further, the coordinate $(X_{1,i}, Y_{1,i})$ of the meshing point of the internal tooth 11b in the O-XY coordinate system referencing the center O of the internal tooth 11b is calculated according to the following formula (14).

[M15]

$$\alpha_{2,i} = \cos^{-1}\left(\frac{r_{b2}}{\sqrt{X_{1,i}^2 + Y_{1,i}^2}}\right) \quad (13)$$

$\alpha_{2,i}$: Pressure angle of the internal tooth corresponding to the i-th external tooth from the reference meshing tooth.

[M16]

$$\begin{pmatrix} X_{2,i} \\ Y_{2,i} \end{pmatrix} = \begin{pmatrix} \sqrt{X_{1,i}^2 + Y_{1,i}^2} \cdot \sin(\alpha_i + \text{inv}\alpha_i - \text{inv}\alpha_{2,i} - \alpha') \\ \sqrt{X_{1,i}^2 + Y_{1,i}^2} \cdot \cos(\alpha_i + \text{inv}\alpha_i - \text{inv}\alpha_{2,i} - \alpha') \end{pmatrix} \quad (14)$$

$X_{2,i}, Y_{2,i}$: The i-th internal tooth meshing point in the x, y coordinate when the i-th internal tooth from the reference meshing tooth joins the meshing engagement in the o-xy coordinate system referencing the center O of the internally toothed gear wheel.

By the formulae (12) and (14), the gap $\delta_1$ between the tooth flank of the i-th internal tooth 11b from the reference meshing tooth and the tooth tip of the first external tooth 42 is represented as the formula (15). Thus the gap $\delta_1$ can be calculated. Accordingly, the gap $\delta_1$ is represented as the function with the variables of the module m, the reference pressure angle α, the number of teeth $z_1$, $z_2$, the addendum modification coefficient $x_1$ $x_2$ and the center to center distance "a".

[M17]

$$\delta_i = \sqrt{(X_{2,i} - X_{1,i})^2 + (Y_{2,i} - Y_{1,i})^2}$$
$$= f(m, \alpha, z_1, z_2, x_1, x_2, a) \quad (15)$$

$\delta_i$: Gap between the i-th external tooth tip and internal tooth flank from the reference meshing tooth $f(m, \alpha, z_1, z_2, x_1, x_2, a)$: Function having variables of m, α, $z_1$, $z_2$, $x_1$, $x_2$, a Next, the displacement amount of each tooth displaced by the force received by the each tooth when the transmitting force is T [N] transmitted between the first externally toothed gear wheel 40 and the internally toothed gear wheel 11 is calculated. It is noted here that as shown in FIG. 5, when as the reference meshing tooth, the first external tooth 42 and the internal tooth 11b are in meshing engagement, the neighborhood area of the reference meshing tooth of the first external tooth body 41 is elastically deformed in an extended direction in circumferential direction by the transmitting force T. On the other hand, the neighborhood area of the reference meshing tooth of the internal tooth body 11a is elastically deformed in a contracting direction in a circumferential direction by the transmitting force T. Further, the neighborhood area of the reference meshing tooth of the first external tooth 42 is deflected and deformed by the force received from the corresponding internal tooth 11b. On the other hand, the neighborhood area of the reference meshing tooth of the internal tooth 11b is deflected and deformed by the force received by the corresponding external tooth 42.

In other words, the displacement amount $\delta_{1,i}$ of the first external tooth 42 towards the circumferential and extending direction and the displacement amount $\delta_{2,i}$ towards the circumferential contracting direction are calculated by the following formula (16). It is noted here that the first term of the first formula in the first equation of the formula (16) corresponds to the elastic deformation amount in circumferential and extending direction of the first external tooth body 41 and the second term corresponds to the deflected deformation of the first external tooth 42. Further, the second term of the second equation of the formula (16) corresponds to the elastic deformation amount in circumferential and contracting direction of the internal tooth body 11a and the second term corresponds to the deflected deformation of the internal tooth 11b.

[M18]

$$\delta_{1,i} = \frac{P_{1,i}}{E \cdot S_{1,i}}\left[T - \sum_{n=1}^{i}(F_{1,i} \cdot \cos\alpha_{x1})\right] + \Delta t_{1,i}$$
$$\delta_{2,i} = \frac{P_{2,i}}{E \cdot S_{2,i}}\left[T - \sum_{n=1}^{i}(F_{2,i} \cdot \cos\alpha_{2,i})\right] - \Delta t_{2,i} \quad (16)$$

$\delta_{1,i}$: Displacement amount in an extending direction of the i-th external tooth from the reference meshing tooth.

$\delta_{2,i}$: Displacement amount in a contracting direction of the i-th internal tooth from the reference meshing tooth.

$P_{1,i}$: Pitch width of the i-th external tooth from the reference meshing tooth $P_{2,i}$: Pitch width of the i-th internal tooth from the reference meshing tooth $S_{1,i}$: Effective area of the i-th external tooth from the reference meshing tooth $S_{2,i}$: Effective area of the i-th internal tooth from the reference meshing tooth $F_{1,i}$: Force from the internal tooth received by the i-th external tooth from the meshing tooth $F_{2,i}$: Force from the external tooth received by the i-th internal tooth from the meshing tooth E: Longitudinal elastic modulus of the externally toothed gear wheel and the internally toothed gear wheel T: Transmission force between the externally toothed gear wheel and the internally toothed gear wheel $\Delta t_{1,i}$: Deflection amount in a circumferential direction of the i-th external tooth from the reference meshing tooth $\Delta t_{2,i}$: Deflection amount in a circumferential direction of the i-th internal tooth from the reference meshing tooth As shown in FIG. 6, the load which is received by each tooth corresponding to each phase from the reference meshing tooth is indicated and the relationship between the load and the phase shows that farther the tooth from the reference meshing tooth, the smaller the load the tooth receives. The effective cross sectional area $S_{1,i}$ of the i-th first external tooth 42 from the reference meshing tooth and the effective cross sectional area $S_{2,i}$ of the i-th internal tooth 11b from the reference meshing tooth in the formula (16) are calculated according to the formula (17).

[M19]

$$S_{1,i} = r_{1i} - r_{in}) \cdot B_1$$
$$S_{2,i} = (r_{out} - r_{2i}) \cdot B_2 \quad (17)$$

$r_{in}$: Inner diameter of the tooth body of the externally toothed gear wheel $r_{out}$: Outer diameter of the tooth body of the internally toothed gear wheel $B_1$: Tooth width of the externally toothed gear wheel $B_2$: Tooth width of the internally toothed gear wheel $r_{1i}$: Radius of the meshing position of the external tooth $r_{2i}$: Radius of the meshing position of the internal tooth Finally the specifications that can satisfy the relationship shown in the formula (18) are determined according to the formulae (15) and (16).

[M20]

$$|\delta_{1,i} + \delta_{2,i}| = \delta_i \quad (18)$$

Regarding to the formula (18), since the reference meshing tooth (i=1) has already been in contact, and accordingly, the reference tooth naturally satisfies the formula (18). Further, the specifications of each tooth are defined to satisfy the formula (18) when at least the number "i" is set to be i=2. Accordingly, in concrete, the module "m" is defined. When the number "I" is 2 (i=2), in order to satisfy the relationship defined by the formula (18), at least each tooth adjacent to the reference meshing tooth should be in meshing engagement condition.

Further, by lessening the size of the module "m" smaller than the module determined to satisfy the formula (18) when the number "I" is 2, the value of "i" satisfying the formula (18) becomes large. In other words, the upper limit value of the module "m" is decided by the formula (18). By selecting a smaller module within the scope that the other conditions are satisfied, a number of teeth as possible can join the meshing engagement.

As understood from the formulae (16) and (18), by the elastic deformation in extending direction or elastic deformation in contracting at the reference meshing tooth neighboring areas of the respective first external tooth body 41 and internal tooth body 11a, the specifications are determined so that the number of meshing between the first external tooth 42 and the internal tooth 11b becomes as much as possible. Thus, the module "m" of the internally toothed gear wheel 11 and the first externally toothed gear wheel 40 is reduced as small as possible in order to increase the number of meshing teeth by elastically deforming the neighborhood area of the reference meshing tooth of the first external tooth body 41 and the internal tooth body 1a, as stated above.

1-5. Detail Structure of Internal Tooth and External Tooth

In order to achieve the above, the number of internal teeth 11b and the number of each first external tooth 40 and second external tooth 50 are set to be 100 or more, respectively. Particularly, more the number of teeth being more than 100 increases, the number of teeth of the internal tooth 11b and the first and the second external teeth 42 and 52 having the smaller gap in circumferential direction increases. Further, the ratio (Na/Nb) of number of teeth between the number Na of the first and the second external teeth 42 and 52 and the number Nb of the internal tooth 11b is set to be the value between 0.9 or more and less than 1. Particularly, more the value of ratio (Na/Nb) comes closer to the value 1, more the number of internal tooth 11b and the first and the second external teeth 42 and 52 having the smaller gap in the circumferential direction increases.

1-6. Analysis of Stress Generated at the Internal and External Teeth

The result of the FEM analysis is explained hereinafter. The stress analysis for the internal tooth 11b and the first and the second external teeth 42 and 52 was conducted by varying the value of the ratio (Na/Nb) from 0.975 to 0.995 and by varying the number of teeth of the internal tooth 11b from 50 to 200 under the condition of the rotational driving force being applied.

In FIG. 7 horizontal axis indicates the ratio of the number of teeth (Na/Nb) between the first and the second external teeth 42 and 52 and the internal tooth 11b and the vertical axis indicates the number of meshing teeth. The number of teeth of the internal tooth 11b was analyzed with the numbers of 120 and 200. In FIG. 8, the horizontal axis indicates the number of teeth 11b and the vertical axis indicates the number of meshing teeth. The tooth ratio (Na/Nb) shows the variable values of 0.975, 0.991 and 0.995.

As indicated in FIGS. 7 and 8, in the case that the number of internal teeth 11b is the same, the number of meshing teeth increases as the tooth ratio (Na/Nb) increases. Particularly, by setting the value of the tooth ratio (Na/Nb) to 0.975 or more and the number of teeth to 120 or more, the number of meshing teeth indicates the value of four or more. In other words, the number of meshing teeth under the non-driving condition (in theoretical) can be increased to two times or more. Also, larger the number of teeth of the internal tooth 11b, more the number of meshing teeth increases. Particularly, the number of meshing teeth indicates four or more when each number of teeth of the internal teeth 11b and the first and the second external teeth 42 and 52 indicates the value of hundred (100) or more, respectively. In other words, the number of meshing teeth can be increased to two times or more under the non-driving condition (in theoretical).

An FEM (finite element method) analysis was conducted to find out which internal tooth 11b is to be engaged with which tooth of the first and the second external teeth 42 and 52 under the driving condition, when the meshing teeth of the internal tooth 11b and the first and the second external teeth 42 and 52 are set to be the reference meshing teeth, respectively under the non-driving condition. In more detail, this can be performed by analyzing the gap between the internal tooth 11b and the first and the second external teeth in the circumferential direction. FIG. 9 shows the gap in a circumferential direction between the internal tooth 11b and the first and the second external teeth 42 and 52 positioned at the neighborhood area of the reference meshing tooth at one side in a circumferential direction and the other side in a circumferential direction in the horizontal axis direction with respect to the center (O) of the reference meshing tooth and shows the comparison of the case of the ratio of the number of teeth being 0.975, in which the number of external tooth is 117 and the number of internal tooth is 120, of the case of the ratio of the number of teeth being 0.991, in which the number of external tooth is 119 and the number of internal tooth is 120 and of the case of the ratio of the number of teeth being 0.995, in which the number of external tooth is 199 and the number of internal tooth is 200, respectively. The vertical axis indicates the gap in a circumferential direction. It is noted that the one side in the circumferential direction of the horizontal axis is defined to be the positive number side and the other side is defined to be the negative number side.

As shown in FIG. 9, farther the meshing tooth separates away from the reference meshing tooth in both circumferential sides, larger the circumferential gap becomes. Further, as to any tooth away from the reference meshing tooth, larger the number of tooth ratios, smaller the circumferential gap becomes. In any of the analysis results, the circumferential gap is varied from the reference meshing tooth similarly in both circumferential sides. Accordingly, the number of meshing teeth between the internal tooth 11b and the first and the second external teeth 42 and 52 in the one circumferential side with respect to the reference meshing tooth is the same with the number of meshing teeth between the internal tooth 11b and the first and the second external teeth 423 and 52 in the other circumferential side with respect to the reference meshing tooth when the rotational driving force is transmitted.

Further, FIGS. 10 and 11 show the analysis result of the number of the meshing teeth and the maximum surface pressure of the cases of the reduction gear ratios of 39, 99 and 199, respectively, in response to the variation of the load torque. From the results, the maximum surface pressure can be reduced even when the load torque is increased.

1-7. Effects

By reducing the size of module "m", the height of the internal tooth 11b and the first external tooth 42 can be shortened and accordingly, the deflection amount of the internal tooth 11b and the external tooth 42 can be minimized. In other words, the value of the second term in the formula (16) becomes small. If the deflection amount of the internal tooth 11b and the first external tooth 42 should increase, an undesired contact of the tip end corner of the internal tooth 11b and the first external tooth 42 with the mating tooth flank may occur. This undesired contact may raise a further problem that the surface pressure of the contacted tooth flank may be raised. However, by decreasing the size of module "m", the deflection amount of the internal tooth 11*b* and the first external tooth 42 can be reduced thereby avoiding any undesired contact of the tip end corner of the internal tooth 11*b* and the first external tooth 42 with the mating tooth flank. This means that a generation of high surface pressure can be prevented which may arise due to the contact of the tip end corner of the tooth with the mating tooth flank. By reducing the surface pressure generated at the first external tooth 42 and the internal tooth 11*b*, the acceptable load to be received by the first external tooth 42 and the internal tooth 11*b* can be increased. As the result, further high load torque transmission can be achieved through the internally toothed gear wheel 11 and the first externally toothed gear wheel 40 as a whole.

As shown in FIG. 6, the load generated upon the internal tooth body 11*a* and the first external tooth body 41 becomes smaller as farther away from the position of the reference meshing tooth in a circumferential direction. In other words, the internal tooth body 11*a* and the first external tooth body 41 largely elastically deform in an extending direction or in a contracting direction as the position thereof is closer to the reference meshing tooth in a circumferential direction. Thus, as stated above, the size of module m becomes small, i.e., when the diameter is the same, the number of the first external tooth 42 and the internal tooth 11*b* become large. In other words, the pitch P1*i* between the adjacent two first external teeth 42 and the pitch 2*i* between the adjacent two internal teeth 11*b* become narrow. This means that many internal teeth 11*b* and first external teeth 42 exist in the area closer from the reference meshing tooth in a circumferential direction. Accordingly, since many internal teeth 11*b* and first external teeth 42 exist in the position where the elastic extending direction deformation amount or the elastic contracting direction deformation amount is large in the neighborhood area of the reference meshing tooth of the internal tooth body 11*a* and the first external tooth body 41, the atmosphere that a number of internal teeth 11*b* and first external teeth are able to join the meshing engagement. In a circumferential direction can be created.

Further, if the module "m" becomes small, the tooth flank of involute profile of the internal tooth 11*b* and the first external tooth 42 becomes closer to a straight line profile. As the result, each of the contact surface area of the internal tooth 11*b* and the first external tooth 42 becomes large and accordingly, the surface pressure of each internal tooth 11*b* and the first external tooth 42. Thus, a further high load torque transmission can be achieved through the internally toothed gear wheel 11 and the first externally toothed gear wheel 40 as a whole. Further, by lessening the size of module m, the gap between the tooth flank of adjacent internal tooth 11*b* and the first external tooth 42. This may increase the likelihood of joining the meshing engagement to many internal teeth 11*b* and first external teeth.

Further, by lessening the surface pressure to be received by each tooth, the heat treatment which has been conducted without doubt may be eliminated. In other words, as the surface pressure applied to the tooth drops, in some cases, the surface pressure applied to the tooth may be within the allowable pressure resistance level without conducting a heat treatment. This can reduce the manufacturing cost by eliminating a process for the heat treatment.

Further, a down-sized, high speed reduction gear ratio device can be achieved since the involute tooth profile can be applied to the swing internal contact type planetary gear device 1. Further on, by providing the same number of internal tooth 11*b* and the first and second external teeth 42 and 52 which are in meshing engagement with each other in both sides in circumferential direction with respect to the reference meshing tooth, a stable driving torque transmission can be achieved. Still further, under the driving condition, during the displacement of the meshing position between the internal tooth 11*b* and the first and the second external teeth 42 and 52 in a circumferential direction, the elastic deformation amount in the area of neighborhood of the reference meshing tooth of each internal tooth body 11*a* and first and second external tooth bodies 41 and 51 gradually increases and after reaching to the peak, the amount gradually decreases and finally the meshing condition moves to the non-contact condition. As the result, the driving torque transmission can be surely performed and meshing operation can be performed without giving any sudden application of load to each internal tooth 11*b* and first and second external teeth 42 and 52. Thus the device is excellent in durability.

2. Second Embodiment

Next, a rotation driving device 100 using the swing internal contact type planetary gear device 101 will be explained with reference to FIGS. 12 and 13.

The rotation driving device 100 is structured by a motor 180 and the swing internal contact type planetary gear device 101. According to this structure, the rotation driving force of the motor 180 is transmitted to the swing internal contact type planetary gear device 101 to achieve speed reduction operation.

The motor 180 includes a cylindrically shaped rotor 181 and a cylindrically shaped stator 182 positioned opposite to the rotor 181 outwardly in a radial direction. The cylindrical rotor 181 includes, for example, a rotor yoke and a magnet. The stator 182 includes a stator core and a coil wound around the stator core.

The swing internal contact type planetary gear device 101 has basically the same structure as that of the swing internal contact type planetary gear device 1 except the features of a housing 110, an input shaft 120 and a first externally toothed gear wheel 140. Here, only the different points will be explained.

The housing 110 is formed to have a cylindrical bottom surface at the center of which a circular bore is formed and the housing 110 accommodates the other components of the swing internal contact type planetary gear wheel 101 and the motor 180. The stator 182 is fixed to the inner circumferential surface of the housing 110.

The input shaft 120 (corresponds to "shaft" of the claimed invention) is supported by the housing 110 through a fourth bearing 74 inserted into a circular bore of the housing 110 and rotatable relative to the housing 110 centering on the input/output axial line X1. Further, the input shaft 120 is integrally fixed to the rotor 181 by fitting the rotor 181 of the motor 180 into the shaft. Thus, the input shaft 120 receives the rotation driving force of the rotor 181. This input shaft 120 is formed by a base end portion 121, a rotor fitting portion 122, a groove portion 123, a first eccentric body portion 124, a second eccentric body portion 125 and a tip end portion 126 in order from the base end side (right side in FIG. 7) and these portions are formed integrally.

The base end portion 121 is formed with a cylindrical or a columnar shape centering on the input/output axial line X1 as the center axis. The fourth bearing 74 is fitted onto the outer circumferential surface of the base end portion 121 and the input shaft 120 is supported on the housing 110 through the fourth bearing 74 and rotatable about the input/output axial line X1 relative to the housing 110.

The rotor fitting portion 122 is formed to be of cylindrical or columnar shape centering on the input/output axial line X1 as the center axis. The outer diameter of the rotor fitting portion 122 is formed to be larger than the outer diameter of the base end portion 121. The rotor 181, formed separately from the input shaft 120, is fitted onto the outer circumferential surface of the rotor fitting portion 122 by press-fitting. It is noted here that the contact area between the inner circumferential surface of the rotor 181 and the outer circumferential surface of the rotor fitting portion 122 is preferably set to be larger in order to surely fix the rotor 181. In other words, the outer diameter of the rotor fitting portion 122 is larger the better in order to surely fix the rotor 181 to the shaft 120. However, due to the dimensional limitation of the rotation driving device 100 as a whole and diametric limitation of the outer diameter of the rotor 181, the size of the outer diameter of the rotor fitting portion 122 is limited. Accordingly, it is desirable to set the outer diameter of the rotor fitting portion 12 to be the maximum within the above dimensional limitations.

The first eccentric body portion 124 is a portion integrally formed with the first eccentric body 23 of the first embodiment. However, the outer diameter of the first eccentric body portion 124 is set to be greater than the outer diameter of the first eccentric body 23 of the first embodiment. The first eccentric body portion 124 is formed of a hollow shaft or solid shaft shape and includes a circular outer circumferential surface deviated from the input/output axial line X1 and centering on the first eccentric axial line X2.

The second eccentric body portion 125 is a portion formed integrally with the second eccentric body 24 of the first embodiment. The second eccentric body portion 125 is provided at a position closer to the tip end side of the input shaft 220 than the position of the first eccentric body portion 124. This second eccentric body portion 125 is formed of a hollow shaft or a solid shaft shape and includes a circular outer circumferential surface deviated from the input/output axial line X1 and centering on the second eccentric axial line X3. The phase of the second eccentric axial line X3 is 180 degree (180°) deviated from the phase of the first eccentric axial line X2 with respect to the center line of the input/output axial line X1 with the same eccentric amount to the first eccentric axial line X2. The outer diameter of the second eccentric body portion 125 is set to be smaller than the outer diameter of the first eccentric body portion 124. As shown in FIG. 13, the circle (indicated with the dotted line in FIG. 13) of the outer circumferential surface of the second eccentric body portion 125 is formed to be positioned inside of the circle of the outer circumferential surface of the first eccentric body portion 124 as viewed from the axial direction. Further, the second eccentric body portion 125 is positioned at the tip end side in an axial direction from the axial center of the internally toothed gear wheel 11 formed in the housing 110. Accordingly, when the input shaft 120 is rotated about the input/output axial line X1, the first and the second eccentric body portions 124 and 125 orbit the input/output axial line X1.

The groove portion 123 is formed between the rotor fitting portion 122 and the first eccentric body portion 124 and has an outer diameter smaller than the outer diameters of the rotor fitting portion 122 and the first eccentric body portion 124. The tip end portion 126 is provided at the tip end side, i.e., in the side of the output shaft 30. This tip end portion 126, as similar to the base end portion 121, is formed of a hollow shaft or a solid shaft shape centering on the input/output axial line X1 as the center axis. The third bearing 73 is disposed on the outer circumferential surface of the tip end portion 126 and the input shaft 120 supports the output shaft 30 and is rotatable relative to the output shaft 30.

The first externally toothed gear wheel 140 is formed to be of a disc shape having a circular bore at the center thereof. The inner circumferential surface of the first externally toothed gear wheel 140 is inserted onto the outer circumferential surface of the first eccentric body portion 124 of the input shaft 120 through the first bearing 71. The inner diameter of the first externally toothed gear wheel 140 is set to be larger than the inner diameter of the first externally toothed gear wheel 40 of the first embodiment. Further, the first externally toothed gear wheel 140 includes a first external tooth body 141 and a first external tooth 42 similar as the external tooth of the first embodiment. The first external tooth body 141 is formed with a plurality of circular through-holes 141a as similar to the through-holes 41a of the first embodiment.

It is noted here that as stated above, the circle of the outer circumferential surface of the second eccentric body portion 125 is formed to be positioned inside the circle of the outer circumferential surface of the first eccentric body portion 124 and further, the phase of the first eccentric axial line X2 of the first eccentric body portion 124 is deviated from the phase of the second eccentric axial line X3 of the second eccentric body portion 125 with 180 degree (180°) with respect to the center line of input/output axial line X1. In this case, the condition that satisfy the circle of the outer circumferential surface of the second eccentric body portion 125 being positioned inside the circle of the outer circumferential surface of the first eccentric body portion 124 can be obtained by the following formula (19).

[M21]
$$\frac{D1}{2} - \frac{D2}{2} - (\varepsilon 1 + \varepsilon 2) > 0 \tag{19}$$

Wherein:
D1: Outer diameter of the first eccentric body portion 124
D2: Outer diameter of the second eccentric body portion 125
$\epsilon_1$: Eccentric amount of the first eccentric axis X2 of the first eccentric body portion 124
$\epsilon_2$: Eccentric amount of the second eccentric axis X3 of the second eccentric body portion 125.

It is noted that the phase of the first eccentric axial line X2 of the first eccentric body portion 124 is deviated from the phase of the second eccentric axial line X3 of the second eccentric body portion with 180 degree (180°) with respect to the center line of the input/output axial line X1. Assuming that the phase deviation is "θ", the condition that satisfies the circle of the outer circumferential surface of the second eccentric body portion 125 being positioned inside the circle of the outer circumferential surface of the first eccentric body portion 124 can be represented by the following formula (20).

[M22]
$$\frac{D1}{2} - \frac{D2}{2} - (\varepsilon 1 + \varepsilon 2 - 2 \cdot \varepsilon 1 \cdot \varepsilon 2 \cdot \cos\theta) > 0 \tag{20}$$

According to this embodiment, since the swing internal contact type planetary gear device 101 is applied to the rotation driving device 100 as stated above, the effects or advantages of the swing internal contact type planetary gear device 101 can be obtained. Further, the first and the second eccentric body portions 124 and 125 of the swing internal contact type planetary gear device 101 in the rotation driving device 100 and the shaft for transmitting the rotation driving force of the rotor 181 are formed integrally as the input shaft 120, the number of part can be reduced and can achieve the downsizing of the device. However, it is difficult to assemble the first bearing 71 to the first eccentric body portion 124 when the first and the second eccentric body portions 124 and 125 are integrally formed with the input shaft 120.

To solve the problem, by setting the outer diameter of the second eccentric body portion 125 to be smaller than the outer diameter of the first eccentric body portion 124 the circle of the outer circumferential surface of the second eccentric body portion 125 is positioned inside the circle of the outer circumferential surface of the first eccentric body portion 124 as viewed from the axial direction of the input shaft 120. This can make the first bearing 71 to be easily fitted onto the outer circumferential surface of the first eccentric body portion 124, by passing through the second eccentric body portion 125.

3. Third Embodiment

Next, the rotation driving device 200 using the swing internal contact type planetary gear device 201 will be explained with reference to FIG. 14. The rotation driving device 200 includes a motor 180 the structure of which is the same as the motor in the second embodiment and a swing internal contact type planetary gear device 201, the structure of which is substantially the same as the swing internal contact type planetary gear device 1. The housing 210 of this embodiment also is the same structure as that of the housing 110 of the second embodiment. However, the input shaft 220 is different in structure from the input shaft 120 of the second embodiment. The explanation of this embodiment will only be made to the points different from the first and the second embodiments.

The input shaft 220 is formed by a base end portion 221 (right side in FIG. 14), a rotor fitting portion 222, a groove portion 223, a first eccentric body portion 224, a second eccentric body portion 225 and a tip end portion 226 in order from the base end side and these portions are formed integrally. The structures of the base end portion 221, the rotor fitting portion 222, the second eccentric body portion 225 and the tip end portion 226 correspond to and are same to the base end portion 121, the rotor fitting portion 122, the second eccentric body portion 125 and the tip end portion 126 of the input shaft 120 of the second embodiment, respectively.

However, it is necessary for this embodiment to have the first bearing 71 to be able to pass through the outer circumferential surface of the rotor fitting portion 222 when assembling the bearing to the outer circumferential surface of the first eccentric body portion 224. For this purpose, the diameter of the rotor fitting portion 222 is necessary to be smaller than the inner diameter of the first bearing 71. Accordingly, the outer diameter of the rotor fitting portion 222 is desirably set to be the maximum under the condition that the outer diameter of the rotor fitting portion 222 is smaller than the inner diameter of the first bearing 71.

The first eccentric body portion 224 is a portion formed integrally with the first eccentric body 23 of the first embodiment. In other words, the first eccentric body portion 224 is formed to be of hollow shaft or of solid shaft and includes a circular outer circumferential surface centering on the first eccentric axial line which is deviated from the center of the input/output axial line X1. The diameter of the first eccentric body portion 224 is set to be larger than the outer diameter of the base end portion 221 according to this embodiment and the same with the diameter of the second eccentric body portion 225. The position of the first eccentric body portion 224 is located at the base end side from the axial center of the internally toothed gear wheel 11 formed at the housing 210.

The groove portion 223 is formed between the rotor fitting portion 222 and the first eccentric body portion 224 in an axial direction and the diameter of the groove portion 223 is set to be smaller than the outer diameter of the rotor fitting portion 222 and smaller than the outer diameter of the first eccentric body portion 224. Further, the width in an axial direction of the groove portion 223 is set to be larger than the width in an axial direction of the first bearing 71 which supports the first externally toothed gear wheel 40 relative to the first eccentric body portion 224.

According to the embodiment, the rotor 181 and the rotor fitting portion 222 are separately formed at the portion where the rotor 181 of the motor 180 is placed. Thus the first bearing 71 to be assembled to the outer circumferential surface of the first eccentric body portion 224 which is positioned in motor 180 side can be inserted from the motor 180 side. By providing the groove portion 223 having a proper outer diameter and width in an axial direction between the first eccentric body portion 224 and the rotor fitting portion 222, the first bearing 71 can be inserted from the motor 180 side and can be assembled to the outer circumferential surface of the first eccentric body portion 224. Particularly, when the outer diameter of the first eccentric body portion 224 and the outer diameter of the second eccentric body portion 225 are set to be the same diameter, it is effective to insert the first bearing 71 to be assembled to the outer circumferential surface of the first eccentric body portion 224.

4. Fourth Embodiment

4-1. Structure of Electrically Assisted Bicycle

The vehicle driving device according to the present invention applied to an auxiliary driving device of an electrically assisted bicycle will be explained with reference to FIGS. 14 and 15. As shown in FIG. 15, the electrically assisted bicycle includes a frame body 311, front fork 312, a handle 313, saddle 314, front wheel 315, rear wheel 316, main driving device 317 and an auxiliary driving device 318.

The frame 311 is the basic portion of the electrically assisted bicycle and a column (steering column) of the front fork 312 is rotatably supported on the head tube of the frame body 311 through the bearing. A pair of right and left blades of the front fork 312 (component member at the lower end side) is connected to the column.

The front wheel 315 is rotatably supported on the lower end (front end) of the blades of the front fork 312. The rear wheel 316 is rotatably supported on the rear end of the frame body 311. The front and the rear wheels 315 and 316 are formed by a hub 315a, spokes 315b, a rim 315c, a tire 315d (only the numerals for the front wheel structure are referenced). The main driving device 317 is a well-known driving device which drives the rear wheel 316 by means of the legs of the human.

The auxiliary driving device 318 is formed by a main body 320 for the driving device and an electric power supply source device 330. As shown in FIGS. 15 and 16, the main body 320 for the driving device is provided at the hub 315a of the front wheel 315 and includes a motor 340 and a reduction gear apparatus 360 using a swing internal contact type planetary gear device. The electric power supply source device 330 is used for a power source for driving the motor 340 and is fixed to a seat tube of the frame body 311. The power supply source device 330 supplies electricity to the motor 340 through a power supply cable (not shown). The power supply source device 330 is charged by a re-generation energy system when the motor 340 is used as a generator.

4-2. Detail Structure of Driving Device Main Body 320 of Auxiliary Driving Device Next, the detail of the main body 320 of the driving device of the auxiliary driving device 318 will be explained with reference to FIGS. 17 and 18. As shown in FIG. 17, the main body 320 of the driving device includes the motor 340 and the reduction gear apparatus 360.

The motor 340 includes a stator 341 and a rotor 342. This motor 340 is disposed inside of the cylindrical hub 315a of the front wheel 315 in a radial direction. The stator 341 is formed of a cylindrical shape and the coil is wound around. The stator 341 is fixed to and supported by the lower end (front end) of the blades of the front fork 312 through a later explained cylindrical fixed member 453, fixed cover 454 and a first fixed shaft 451. The stator 341 is arranged to be in co-axial with a rotation shaft of the front wheel 315.

The rotor 342 is disposed inside of the stator 341 in a radial direction with a predetermined gap opposite to the inner circumferential surface of the stator 341 and is arranged in co-axial therewith and is relatively rotatable with the stator 341. In other words, the rotor 342 is rotated about the input/output axial line X1 relative to the stator 341 when the electricity is supplied to the coil of the stator 341.

The reduction gear apparatus 360 uses the swing internal contact type planetary gear device 1 of the first embodiment and accordingly, the same structure and parts thereof are referenced with the same numerals and the detail explanation thereof will be omitted. However, since the operation of the reduction gear apparatus 360 applied to the main body 320 of the driving device of the electrically assisted bicycle is different from the operation of the first embodiment and detail explanation will be made hereinafter.

The reduction gear apparatus 360 is arranged coaxially with the motor 340 for driving the front wheel 315 by reducing the rotation speed of the driving force of the motor 340. The reduction gear apparatus 360 includes an input shaft 410 and an output outer race 420 provided in co-axial with the input shaft 410 and serves as a reduction gear for transmitting the rotation of the input shaft 410 to the output outer race 420 through speed reduction. By fixing the output outer race 420 to the hub 315a of the front wheel 315, the driving force transmitted to the outer race 420 is transmitted to the hub 315a of the front wheel 315. When the brakes are applied to the wheel of the electrically assisted bicycle, the power supply from the power supply source device 330 to the motor 340 stops and at the same time the reduction gear apparatus 360 functions as an accelerator for transmitting the rotation of the output outer race 420 fixed to the front wheel 315 to the input shaft 410 by accelerating the rotation of the output outer race 420. The motor 340 functions as a generator in this case.

The outline of the reduction gear apparatus 360 will be explained. An internally toothed gear wheel 11 which has the same structure as the internally toothed gear wheel 11, is formed on the inner circumferential surface of the output outer race 420. The first and the second externally toothed gear wheels 40 and 50 which are structured same as those in the first embodiment are swingably rotated relative to a fixed member 450 when the input shaft 410 is rotated. By this operation, the relative rotation difference between the internally toothed gear wheel 11 and the first and the second externally toothed gear wheels 40 and 50 is outputted to the output outer race 420. In other words, the functions of the housing 10 and the output shaft 30 in the first embodiment correspond to the functions of the output outer race 420 and the fixed member 450 in the fourth embodiment, respectively.

Next, the detail structure of the reduction gear apparatus 360 will be explained. The reduction gear apparatus 360 includes the input shaft 410, output outer race 420, fixed member 450, first externally toothed gear wheel 40, second externally toothed gear wheel 50 and a plurality of inner pins 60 having the same structure as the inner pins in the first embodiment.

The input shaft 410 includes a base end portion 411, a first eccentric body 412 and a second eccentric body 413 in order from the base end side (left side in FIG. 17) and these are integrally formed with the input shaft 410. The base end portion 411 is formed of a cylindrical or a columnar shape centering on the input/output axial line X1 as the center axis. The base portion is fitted into the central bore of the rotor 342 and supported by the fixed cover 454 and is rotatable relative to the fixed cover 454 about the input/output axial line X1. The structures of the first eccentric body 412 and the second eccentric body 413 are the same as those of the first eccentric body 23 and the second eccentric body 24 of the first embodiment, respectively.

The output outer race 420 is formed to be the same as the housing 10 of the first embodiment and inside circumferential surface of the output outer race 420 is formed with an internally toothed gear wheel 11 of the first embodiment.

The fixed member 450 is fixed to the lower end (front end) of the blades of the front fork 312. The fixed member 450 is provided with a first fixed shaft 451, a second fixed shaft 452, fixed cylindrical member 453 and a fixed cover 454.

The first fixed shaft 451 is of columnar shape and is inserted into one of the blades of the front fork 312 and fixed thereto. This first fixed shaft 451 is provided to be in co-axial with the input/output axial line. The second fixed shaft 452 includes a shaft portion 452a and a disc portion 452b integrally formed with one end of the shaft portion 452a. The shaft portion 452a of the second fixed shaft 452 is inserted into the other of the blades of the front fork 312 and fixed thereto. The second fixed shaft 452 is arranged to be in co-axial with the first fixed shaft 451. The shaft portion 452a relatively rotatably supports the output outer race 420 through a bearing. The disc portion 452b is positioned at the other end side of the shaft portion 452a in the first fixed shaft 451 side. Further, the disc portion 452b is provided with a plurality of circular recessed portions 452c centering around the input/output axial line X1 in a circumferential direction with an equal interval with one another. In other words, each circular center of the circular recessed portions 452c is positioned concyclic having the circle center as the center of the input/output axial line X1. In this embodiment the number of the circular recessed portion is ten (10).

The fixed cover 454 is formed with a disc shape and is provided with a circular bore centering on the input/output axial line X1. The first fixed shaft 451 is inserted into this circular bore and the fixed cover 454 is fixed to the first fixed shaft 451. The outer circumferential surface of the fixed cover 454 rotatably supports the hub 315a of the front wheel 315 through a bearing. Further, the inner circumferential surface of the fixed cover 454 rotatably supports one end side (left side in FIG. 17) of the base end portion 411 of the input shaft 410 through a bearing.

The fixed cylindrical member 453 has a bottom a cylindrical portion 453a and a disc portion 453b formed integrally with one end (right side in FIG. 17) of the cylindrical portion 453a. The other end (left side in FIG. 17) of the cylindrical portion 453a of the fixed cylindrical member 453 is fixed to the outer circumferential brim of the fixed cover 454. In other words, the fixed cylindrical member 453 is fixed to the front fork 312 through the fixed cover 454 and the first fixed shaft 451. The stator 341 as stated earlier is fixed to the inner circumferential surface of the cylindrical portion 453a of the fixed cylindrical member 453.

A circular bore centering on the input/output axial line X1 is provided on the disc portion 453b of the fixed cylindrical member 453. Further, a plurality of circular recessed bores 453c is provided on the disc portion 453b of the fixed cylindrical member 453 centering on the input/output axial line X1 and with an equal interval with one another in a circumferential direction. Each circular center of the circular recessed portions 453c is positioned concyclic having the circle center as the center of the input/output axial line X1. Each of the circular recessed portions 453c formed on the disc portion 453b of the fixed cylindrical member 453 is in co-axial with and in the same shape with each corresponding circular recessed portion 452c formed on the disc portion 452b of the second fixed shaft 452. Further, the inner circumferential surface of the circular bore of the fixed cylindrical member 453 rotatably supports the other end side (right side in FIG. 17) of the base end portion 411 of the input shaft 410 through a bearing. Further, the motor 340 is arranged in an axial direction between the disc portion 453b of the fixed cylindrical member 453 and the fixed cover 454. Still further, the first and the second externally toothed gear wheels 40 and 50 are disposed between the disc portion 452b of the second fixed shaft 452 and the disc portion 453b of the fixed cylindrical member 453 in an axial direction.

The inner pins 60 are respectively inserted into the circular recessed portions 452c of the disc portion 453b of the second fixed shaft 452 and the circular recessed portions 453c of the disc portion 453b of the fixed cylindrical member 453 and further inserted into the circular through-holes 41a and 51a formed on the first and the second external tooth bodies 41 and 51, respectively.

4-3. Operation of Driving Device Main Body of the Auxiliary Driving Device

The operation of thus structured main body 320 of the auxiliary driving device 318 will be explained. First, upon rotation of the rotor 342 of the motor 340, the driving force of the rotor 342 is transmitted to the input shaft 410. Then the input shaft 410 is rotated about the input/output axial line X1. This rotational movement the first and the second eccentric bodies 412 and 413 orbit the input/output axial line X1. Then upon orbiting movement of the first eccentric body 412, the first externally toothed gear wheel 40 orbits the input/output axial line X1. At the same time, upon orbiting movement of the second eccentric body 413, the second externally toothed gear wheel 50 orbits the input/output axial line X1.

It is noted here that the inner pins 60 are inserted into the circular through-holes 41a and 51a of the first and the second external tooth bodies 41 and 51. Each inner pin 60 is fixed to the front fork 312 through the fixed member 450. Accordingly, the rotation of the first and the second externally toothed gear wheels 40 and 50 relative to the front fork 312 are restricted. In other words, by the rotation of the input shaft 410 about the input/output axial line X1, the first and the second externally toothed gear wheels 40 and 50 orbit the input/output axial line X1, but do not rotate about the second eccentric axial line X2 and X3. However, the first and the second externally toothed gear wheels 40 and 50 relatively orbit and rotate, when seen from the input shaft 410.

Thus, the first and the second externally toothed gear wheels 40 and 50 orbit while rotation thereof being restricted and accordingly, the phase of meshing engagement with the internally toothed gear wheel 11 of the output outer race 420 among the first and the second externally toothed gear wheels 40 and 50 gradually moves and as a result, the output outer race 420 rotates about the input/output axial line X1 by the number of tooth differences between the first and the second externally toothed gear wheels 40 and 50 and the internally toothed gear wheel 11. This means that as the input shaft 410 makes one rotation, the output outer race 420 makes a rotation by an angle obtained by multiplying the difference of the number of teeth between the first and the second externally toothed gear wheels 40 and 50 and the internally toothed gear wheel 11 by each inter-dental phase of the internally toothed gear wheel 11. Accordingly, smaller the inter-dental phase value of the internally toothed gear wheel 11 and lesser the number of tooth differences between the first and the second externally toothed gear wheels 40 and 50 and the internally toothed gear wheel 11, more the reduction ratio increases.

The output outer race 420 is fixed to the hub 315a of the front wheel 315 and accordingly, the output outer race 420 transmits the decelerated driving force of the motor 340 to the hub 315a and auxiliary drives the front wheel 315. On the other hand, for example, when the electrically assisted bicycle is under deceleration by the braking operation, the output outer race 420 inputs the rotation of the front wheel 315 to accelerate the rotation of the input shaft 410 and by driving the rotor 342, the motor 340 generates the electricity to charge the power supply source device 330.

Others

The embodiments explained above are exampled for the case of applying the vehicle driving device to an auxiliary driving device of the electrically assisted bicycle. However, the vehicle driving device can be applied to the main driving device for the electrically assisted bicycle. Further, other than a bicycle, the invention can be applied to a driving device for a motorcycle. Further, the invention also can be applied to a driving device for an electrically assisted wheel chair. In any case, the effects of the invention can be achieved.

EXPLANATION OF REFERENCE NUMERALS 1, 101, 201: swing internal contact type planetary gear device, 11: internally toothed gear wheel, 11a: internal tooth body, 11b: internal tooth, 20, 120, 220: input shaft, 23: first eccentric body, 24: second eccentric body, 122, 222: rotor fitting portion, 123, 223: groove portion, 124, 224: first eccentric body portion, 125, 225: second eccentric body portion, 40, 140: first externally toothed gear wheel, 41, 141: first external tooth body, 42: first external tooth, 50: second externally toothed gear wheel, 51: second external tooth body, 52: second external tooth, 180: motor, 181: rotor, 182: stator, 340: motor, 341: stator, 342: rotor, 360: reduction gear apparatus, 410: input shaft, 412: first eccentric body, 413: second eccentric body, X1: input/output axial line, X2: first eccentric axial line, X3: second eccentric axial line.

The invention claimed is:

1. A swing internal contact type planetary gear device comprising:
   an eccentric body rotating about an input/output axial line and having a center line being an eccentric axial line, the eccentric axial line is deviated from the input/output axial line;

an internally toothed gear wheel provided with an annular internal tooth body and a plurality of internal teeth formed integrally with the internal tooth body in an inner circumferential side thereof, the center line thereof being the input/output axial line; and an externally toothed gear wheel provided with an annular external tooth body and a plurality of external teeth formed integrally with the external tooth body in an outer circumferential side thereof, the externally toothed gear wheel being relatively rotatably supported on the eccentric body and swingably rotating relative to the internally toothed gear wheel in meshing engagement therewith under the driving condition, the center line thereof being the eccentric axial line, wherein, each of the internal and external teeth is provided with an involute tooth profile and under the driving condition;

one of the internal tooth body and the external tooth body elastically deforms in an extending direction in a circumferential direction and the other of the internal tooth body and the external tooth body elastically deforms in a contracting direction in a circumferential direction, whereby the number of meshing teeth between the internal tooth and the external tooth is set to be larger than the number of meshing teeth between the internal tooth and the external tooth under a non-driving condition;

assuming that a tooth number "i" of each of reference meshing teeth of with the internal tooth and the external tooth meshing with each other under a non-driving condition is defined as "1" and the number "i" of each of the internal tooth and the external tooth is defined to be the value added every one (1) whenever it is leaving away from the reference meshing tooth, a displacement amount in an extending direction of one of the teeth between the internal tooth and the external tooth, each tooth being numbered as "i", is defined to be the value of $\delta_{1,i}$, a displacement amount in a contracting direction of the other of the teeth between the internal tooth and the external tooth, each tooth being numbered as "i", is defined to be the value of $\delta_{2,i}$, and that, a gap between the tooth flank of the internal tooth and the tooth tip of the external tooth each tooth being numbered as "i", is defined to be the value of $\delta_i$, wherein, a module of each of the internally toothed gear wheel and the externally toothed gear wheel is set as the value satisfied the following formula (1):

[M1] $|\delta_{1,i} + \delta_{2,i}| = \delta_i$ (1).

2. The swing internal contact type planetary gear device according to claim 1, wherein, the displacement amount $\delta_{1,i}$ in the extending direction of the one of the teeth between the internal tooth and the external tooth, each tooth being numbered as "i", is defined to be the value obtained by the following formula (2), the displacement amount $\delta_{2,i}$ in the contracting direction of the other of the teeth between the internal tooth and the external tooth, each tooth being numbered as "i", is defined to be the value obtained by the following formula (3) and the gap $\delta_i$ between the tooth flank of the internal tooth and the tooth tip of the external tooth each tooth being numbered as "i", is defined to be the value obtained by the following formula (4):

[M2]
$$\delta_{1,i} = \frac{P_{1,i}}{E \cdot S_{1,i}} \left[ T - \sum_{n=1}^{i} (F_{1,i} \cdot \cos\alpha_{x1}) \right] + \Delta t_{1,i} \quad (2)$$

$\delta_{1,i}$: displacement amount of the i-th tooth from the reference meshing tooth in an extending direction, $P_{1,i}$: pitch width of the i-th tooth from the reference meshing tooth, $S_{1,i}$: effective cross sectional area of the i-th tooth from the reference meshing tooth, $F_{1,i}$: force received by the i-th tooth of the one of the external tooth and the internal tooth from the reference meshing tooth and applied by the other of the external tooth and the internal tooth, E: longitudinal elastic modulus of the one of the externally toothed gear wheel and the internally toothed gear wheel, T: force transmitted between the externally toothed gear wheel and the internally toothed gear wheel, $\Delta t_{1,i}$: deflection amount of the i-th tooth of the one of the internal tooth and the external tooth from the reference meshing tooth in a circumferential direction, $\alpha_{x1}$: random circular pressure angle from the base circle to the tooth tip, wherein, the suffix "1" means one of the externally toothed gear wheel and the internally toothed gear wheel:

[M3]
$$\delta_{2,i} = \frac{P_{2,i}}{E \cdot S_{2,i}} \left[ T - \sum_{n=1}^{i} (F_{2,i} \cdot \cos\alpha_{2,i}) \right] - \Delta t_{2,i} \quad (3)$$

$\delta_{2,i}$ displacement amount of the i-th tooth from the reference meshing tooth in a contracting direction, $P_{2,i}$: pitch width of the i-th tooth from the reference meshing tooth, $S_{2,i}$: effective cross sectional area of the i-th tooth from the reference meshing tooth, $F_{2,i}$: force applied by the external tooth and received by the i-th tooth from the reference meshing tooth, E: longitudinal elastic modulus of the other of the externally toothed gear wheel and the internally toothed gear wheel, T: force transmitted between the externally toothed gear wheel and the internally toothed gear wheel, $\Delta t_{2,i}$: deflection amount of the i-th tooth of the other of the internal tooth and the external tooth from the reference meshing tooth in a circumferential direction, $\alpha_{x1}$ and $\alpha_{x2}$: random circle pressure angle from the base circle to the tooth tip, wherein, the suffix "2" means the other of the externally toothed gear wheel and the internally toothed gear wheel:

[M4]
$$\delta_i = \sqrt{(X_{2,i} - X_{1,i})^2 + (Y_{2,i} - Y_{1,i})^2} \quad (4)$$
$$= f(m, \alpha, z_1, z_2, x_1, x_2, a)$$

$\delta_i$: gap between the i-th external tooth tip and internal tooth flank from the reference meshing tooth, $f(m, \alpha, z_1, z_2, x_1, x_2, a)$: function having variables of m, $\alpha$, $z_1, z_2, x_1, x_2, a$, m: module, $z_1, z_2$: number of teeth, $\alpha$: reference pressure angle, $x_1, x_2$: addendum modification coefficient, a: distance between the centers, $X_{2,i}, Y_{2,i}$: i-th internal tooth meshing point coordinate (X,Y) when the i-th internal tooth from the reference meshing tooth joins the meshing operation in the O-XY coordinate with the center "0" of the internally toothed gear wheel as the reference point, $X_{1,i}, Y_{1,i}$: i-th external tooth meshing point coordinate (X,Y) when the i-th external tooth from the reference meshing tooth joins the meshing operation in the O-XY coordinate with the center "O" of the internally toothed gear wheel as the reference point.

3. The swing internal contact type planetary gear device according to claim 2, wherein, the module of each of the internally toothed gear wheel and the externally toothed gear wheel is set as the value satisfied the formula (1) or less than the value thereof, wherein the number "i" satisfies the condition "i=2".

4. A rotation driving device comprising:

a motor having a cylindrically shaped rotor and a cylindrically shaped stator disposed opposite to the rotor outwardly in a radial direction thereof;

the swing internal contact type planetary gear device as set forth in claim 1; and a shaft transmitting a rotation of the motor to the eccentric body of the swing internal contact type planetary gear device, wherein the eccentric body includes;

a first eccentric body having a center line being a first eccentric axial line, the first eccentric axial line deviated from the input/output axial line, and a second eccentric body having a center line being a second eccentric axial line, the second eccentric axial line deviated from the input/output axial line in a different direction from the direction of the first eccentric axial line, the externally toothed gear wheel includes;

a first externally toothed gear wheel relatively rotatably supported on the first eccentric body, and a second externally toothed gear wheel relatively rotatably supported on the second eccentric body, and the shaft includes;

a rotor fitting portion for receiving at an outer circumferential surface thereof the rotor which is formed separately from the rotor fitting portion, a first eccentric body portion formed integrally with the first eccentric body, and a second eccentric body portion formed integrally with the second eccentric body at the opposite side of the rotor fitting portion relative to the first eccentric body, wherein a circle of an outer circumferential surface of the second eccentric body portion is formed to be smaller than the outer diameter of a circle of an outer circumferential surface of the first eccentric body portion and is positioned inside of the circle of the outer circumferential surface of the first eccentric body portion when viewed from an axial direction of the shaft.

5. A rotation driving device comprising:

a motor having a cylindrically shaped rotor and a cylindrically shaped stator disposed opposite to the rotor outwardly in a radial direction thereof;

the swing internal contact type planetary gear device as set forth in claim 1; and a shaft transmitting a rotation of the motor to the eccentric body of the swing internal contact type planetary gear device, wherein the eccentric body includes;

a first eccentric body having a center line being a first eccentric axial line, the first eccentric axial line deviated from the input/output axial line and centering on a first eccentric axial line, and a second eccentric body having a center line being a second eccentric axial line, the second eccentric axial line deviated from the input/output axial line in a different direction from the direction of the first eccentric axial line, the externally toothed gear wheel includes;

a first externally toothed gear wheel relatively rotatably supported on the first eccentric body, and a second externally toothed gear wheel relatively rotatably supported on the second eccentric body, and the shaft includes;

a rotor fitting portion for receiving at an outer circumferential surface thereof the rotor which is formed separately from the rotor fitting portion, a first eccentric body portion formed integrally with the first eccentric body, a second eccentric body portion formed integrally with the second eccentric body at the opposite side of the rotor fitting portion relative to the first eccentric body, and a groove portion formed between the rotor fitting portion and the first eccentric body portion in an axial direction, having a diameter smaller than an outer diameter of the rotor fitting portion and an outer diameter of the first eccentric body portion, and having a width in an axial direction wider than a width in an axial direction of a first bearing which supports the first externally toothed gear wheel relative to the first eccentric body portion.

* * * * *